(12) United States Patent
Nicol

(10) Patent No.: US 11,978,097 B2
(45) Date of Patent: May 7, 2024

(54) SYSTEM AND METHOD FOR FINDING AN OPTIMAL REAL ESTATE AGENT OR AGENCY

(71) Applicant: Quant Property Solutions Australia Pty Ltd, Ballarat (AU)

(72) Inventor: James Nicol, Ballarat (AU)

(73) Assignee: Quant Property Solutions Australia PTY LTD (AU)

(*) Notice: Subject to any disclaimer, the term of this patent is extended or adjusted under 35 U.S.C. 154(b) by 231 days.

(21) Appl. No.: 17/523,137

(22) Filed: Nov. 10, 2021

(65) Prior Publication Data

US 2022/0172144 A1 Jun. 2, 2022

(51) Int. Cl.
| | | |
|---|---|---|
| *G06Q 30/00* | (2023.01) | |
| *G06F 16/2457* | (2019.01) | |
| *G06Q 10/1053* | (2023.01) | |
| *G06Q 30/0282* | (2023.01) | |
| *G06Q 30/0601* | (2023.01) | |
| *G06Q 50/16* | (2012.01) | |

(52) U.S. Cl.
CPC ... *G06Q 30/0282* (2013.01); *G06F 16/24578* (2019.01); *G06Q 10/1053* (2013.01); *G06Q 30/0627* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 2002/0065739 | A1* | 5/2002 | Florance | G06Q 30/06 705/26.43 |
| 2009/0012803 | A1* | 1/2009 | Bishop, III | G06Q 10/063 705/323 |
| 2011/0060737 | A1* | 3/2011 | Cardella | G06F 16/903 707/E17.014 |
| 2011/0078138 | A1* | 3/2011 | Cardella | G06F 16/903 707/723 |
| 2012/0072315 | A1* | 3/2012 | Polston | G06Q 40/00 705/30 |
| 2015/0317581 | A1* | 11/2015 | Fawaz | G06Q 10/0639 705/313 |
| 2016/0055601 | A1* | 2/2016 | Levy | G06Q 30/06 705/313 |
| 2016/0155181 | A1* | 6/2016 | Romaya | G06Q 50/167 705/26.63 |
| 2018/0374170 | A1* | 12/2018 | Kuenzi | G06F 16/9535 |

* cited by examiner

*Primary Examiner* — Matthew T Sittner

(57) ABSTRACT

A method and system for providing an optimal real estate agent or agency for a user to use to sell a property by (a) electronically accessing real estate parameters from a plurality of proprietary databases; (b) electronically assigning a value to each agent or agency for each parameter compared to a market average for each parameter; (c) electronically ranking each agent or agency based on a cumulative value of the parameters; and (d) electronically sending to the user an optimal real estate agent or agency based on the cumulative value.

9 Claims, 33 Drawing Sheets

| 60 | 62 | 64 | | 66 | 68 | 70 |
|---|---|---|---|---|---|---|
| | | | Address Details | | | |
| Property Type | # Bedrooms | # Bathrooms | # Car Spaces | Land Size | Last Sold | |
| House | 3 | 1 | 1 | 700 m² | 2019-09-02 | |

| 72 | 74 | 76 | 78 | 80 | 82 | 84 |
|---|---|---|---|---|---|---|
| List Price | Sale Price | List / Sale Price Differential | $ per SQM | Days on Market | Sales Agent | Agency |
| $ 515,000 | $ 560,000 | $ 45,000 | $ 800 | 6 days | Francesca Nicol | Biggin Scott Ballarat |

Search Property Details

Type of residence

88 — House ▼

Property Characteristics

94 — # of bedrooms: Studio, 1, 2, 3, 4, 5+

98 — # of bathrooms: None, 1, 2, 3, 4, 5+

102 — # of car spaces: None, 1, 2, 3, 4, 5+

106 — Search Radius: 100m, 250m, 500m, 750m, 1km, 1.5km, 5km, 10km

Timeline: 3 months, 6 months, 12 months, 18 months, 2 years, 3 years
110

Submit — 114

··· — 116
Starting...

56 — Reset

FIG. 12

| | | | | | | |
|---|---|---|---|---|---|---|
| | | | Current Market Averages | | | |
| 117 | Property type | # Bedrooms | # Bathrooms | # Car Spaces | Search Radius | Timeline |
| | House | 3 | 1 | 1 | 1km | 12 months |

| | Average Sale Price | Average List / Sale Price Differential | Average Land Size | Average Price Per SQM | Average Days on Market |
|---|---|---|---|---|---|
| 119 | $ 398,230 | $ -48,228 | 474 m² | $ 911 | 62 days |

FIG. 13

Agent/Agency Rankings

| Agent | Agency | Average List / Sale Price Differential | Average Sale Price ▼ | Average Land Size | Average $/SQM | Average Days on Market | Number of Sold Properties |
|---|---|---|---|---|---|---|---|
| Brooke Reynolds | Jellis Craig Real Estate | $ 47,500 | $625,000 | 475 m² | $1,316/SQM | 3 days | 1 |
| James Nicol | Biggin & Scott Ballarat | $ -43,320 | $601,680 | 322 m² | $1,869/SQM | 161 days | 1 |
| Tony Zelencich | McGrath Ballarat | $ -10,000 | $585,000 | 531 m² | $1,102/SQM | 116 days | 1 |
| Chris McAteer | Buxton Ballarat | $ -10,000 | $485,000 | 388 m² | $1,250/SQM | 71 days | 1 |
| Luke Veal | Jens Veal Partners | $ 0 | $475,000 | 446 m² | $1,065/SQM | 11 days | 1 |
| Penny Shields | Prdnationwide Ballarat | $ -10,000 | $410,000 | 490 m² | $837/SQM | 7 days | 1 |
| Jason Ingram | Wilson Estate Agents Pty Ltd - Ballarat | $ -15,000 | $400,000 | 428 m² | $935/SQM | 37 days | 1 |
| Market Averages | - | -$48,228 | $398,230 | 474 m² | $911/SQM | 62 days | 1 |
| Dominic Morrison | Ballarat Real Estate Pty Ltd | $ -8,000 | $367,000 | 319 m² | $1,150/SQM | 112 days | 1 |
| Lisa Eden-Horvat | Ballarat Property Group | $ -20,000 | $295,000 | 513 m² | $575/SQM | 67 days | 1 |
| Troy Anwyl | Ballarat Property Group | $ -14,000 | $211,000 | 156 m² | $1,353/SQM | 29 days | 1 |

FIG. 14

Agent/Agency Rankings

| Agent | Agency | Average List / Sale Price Differential | Average Sale Price | Average Land Size | Average $/SQM | Average Days on Market | Number of Sold Properties |
|---|---|---|---|---|---|---|---|
| Brooke Reynolds | Jellis Craig Real Estate | $-47,500 | $625,000 | 475 m² | $1,316/SQM | 3 days | 1 |
| Luke Veal | Jens Veal Partners | $0 | $475,000 | 446 m² | $1,065/SQM | 11 days | 1 |
| Dominic Morrison | Ballarat Real Estate Pty Ltd | $-8,000 | $367,000 | 319 m² | $1,150/SQM | 112 days | 1 |
| Penny Shields | Prdnationwide Ballarat | $-10,000 | $410,000 | 490 m² | $837/SQM | 7 days | 1 |
| Tony Zelencich | McGrath Ballarat | $-10,000 | $585,000 | 531 m² | $1,102/SQM | 116 days | 1 |
| Chris McAteer | Buxton Ballarat | $-10,000 | $485,000 | 388 m² | $1,250/SQM | 71 days | 1 |
| Troy Anwyl | Ballarat Property Group | $-14,000 | $211,000 | 156 m² | $1,353/SQM | 29 days | 1 |
| Jason Ingram | Wilson Estate Agents Pty Ltd - Ballarat | $-15,000 | $400,000 | 428 m² | $935/SQM | 37 days | 1 |
| Lisa Eden-Horvat | Ballarat Property Group | $-20,000 | $295,000 | 513 m² | $575/SQM | 67 days | 1 |
| James Nicol | Biggin & Scott Ballarat | $-43,320 | $601,680 | 322 m² | $1,869/SQM | 161 days | 1 |
| Market Averages | - | -$48,228 | $398,230 | 474 m² | $911/SQM | 62 days | 1 |

FIG. 16

Agent/Agency Rankings

| Agent | Agency | Average List / Sale Price Differential | Average Sale Price ▼ | Average Land Size | Average $/SQM | Average Days on Market | Number of Sold Properties |
|---|---|---|---|---|---|---|---|
| Brooke Reynolds | Jellis Craig Real Estate | $ 47,500 | $625,000 | 475 m² | $1,316/SQM | 3 days | 1 |
| James Nicol | Biggin & Scott Ballarat | $ -43,320 | $601,680 | 322 m² | $1,869/SQM | 161 days | 1 |
| Tony Zelencich | McGrath Ballarat | $ -10,000 | $585,000 | 531 m² | $1,102/SQM | 116 days | 1 |
| Chris McAteer | Buxton Ballarat | $ -10,000 | $485,000 | 388 m² | $1,250/SQM | 71 days | 1 |
| Luke Veal | Jens Veal Partners | $ 0 | $475,000 | 446 m² | $1,065/SQM | 11 days | 1 |
| Penny Shields | PRDnationwide Ballarat | $ -10,000 | $410,000 | 490 m² | $837/SQM | 7 days | 1 |
| Jason Ingram | Wilson Estate Agents Pty Ltd - Ballarat | $ -15,000 | $400,000 | 428 m² | $935/SQM | 37 days | 1 |
| Market Averages | - | -$48,228 | $398,230 | 474 m² | $911/SQM | 62 days | 1 |
| Dominic Morrison | Ballarat Real Estate Pty Ltd | $ -3,000 | $367,000 | 319 m² | $1,150/SQM | 112 days | 1 |
| Lisa Eden-Horvat | Ballarat Property Group | $ -20,000 | $295,000 | 513 m² | $575/SQM | 67 days | 1 |
| Troy Anwyl | Ballarat Property Group | $ -14,000 | $211,000 | 156 m² | $1,353/SQM | 29 days | 1 |

Reset

FIG. 17

Agent/Agency Rankings

[Agent Rankings] [Agency Rankings]

| Agent | Agency | Average List / Sale Price Differential | Average Sale Price | Average Land Size | Average $/SQM ▼ | Average Days on Market | Number of Sold Properties |
|---|---|---|---|---|---|---|---|
| James Nicol | Biggin & Scott Ballarat | $ -43,320 | $601,680 | 322 m² | $1,869/SQM | 161 days | 1 |
| Troy Anwyl | Ballarat Property Group | $ -54,000 | $211,000 | 156 m² | $1,353/SQM | 29 days | 1 |
| Brooke Reynolds | Jellis Craig Real Estate | $ 47,500 | $625,000 | 475 m² | $1,316/SQM | 3 days | 1 |
| Chris McAteer | Buxton Ballarat | $ -10,000 | $485,000 | 388 m² | $1,250/SQM | 71 days | 1 |
| Dominic Morrison | Ballarat Real Estate Pty Ltd | $ -8,000 | $367,000 | 319 m² | $1,150/SQM | 112 days | 1 |
| Tony Zelencich | McGrath Ballarat | $ -10,000 | $585,000 | 531 m² | $1,102/SQM | 116 days | 1 |
| Luke Veal | Jens Veal Partners | $ 0 | $475,000 | 446 m² | $1,065/SQM | 11 days | 1 |
| Jason Ingram | Wilson Estate Agents Pty Ltd - Ballarat | $ -15,000 | $400,000 | 428 m² | $935/SQM | 37 days | 1 |
| Market Averages | — | -$48,228 | $398,230 | 474 m² | $911/SQM | 62 days | 1 |
| Penny Shields | PRDnationwide Ballarat | $ -10,000 | $410,000 | 490 m² | $837/SQM | 7 days | 1 |
| Lisa Eden-Horvat | Ballarat Property Group | $ -20,000 | $295,000 | 513 m² | $575/SQM | 67 days | 1 |

Reset

FIG. 18

Agent/Agency Rankings

[Agent Rankings] [Agency Rankings]

| Agent | Agency | Average List / Sale Price Differential | Average Sale Price | Average Land Size | Average $/SQM | Average▲ Days on Market | Number of Sold Properties |
|---|---|---|---|---|---|---|---|
| Brooke Reynolds | Jellis Craig Real Estate | $ 47,500 | $625,000 | 475 m² | $1,316/SQM | 3 days | 1 |
| Penny Shields | Prdnationwide Ballarat | $ -10,000 | $410,000 | 490 m² | $837/SQM | 7 days | 1 |
| Luke Veal | Jens Veal Partners | $ 0 | $475,000 | 446 m² | $1,065/SQM | 11 days | 1 |
| Troy Anwyl | Ballarat Property Group | $ -14,000 | $211,000 | 156 m² | $1,353/SQM | 29 days | 1 |
| Jason Ingram | Wilson Estate Agents Pty Ltd - Ballarat | $ -15,000 | $400,000 | 428 m² | $935/SQM | 37 days | 1 |
| Market Averages | - | -$48,228 | $398,238 | 474 m² | $911/SQM | 62 days | 1 |
| Lisa Eden-Horvat | Ballarat Property Group | $ -20,000 | $295,000 | 513 m² | $575/SQM | 67 days | 1 |
| Chris McAteer | Buxton Ballarat | $ -10,000 | $485,000 | 388 m² | $1,250/SQM | 71 days | 1 |
| Dominic Morrison | Ballarat Real Estate Pty Ltd | $ -6,000 | $367,000 | 319 m² | $1,150/SQM | 112 days | 1 |
| Tony Zelencich | McGrath Ballarat | $ -10,000 | $585,000 | 531 m² | $1,102/SQM | 116 days | 1 |
| James Nicol | Biggin & Scott Ballarat | $ -43,320 | $601,680 | 322 m² | $1,869/SQM | 161 days | 1 |

Reset

FIG. 19

Agent/Agency Rankings

[Agent Rankings] [Agency Rankings]

| Agent | Agency | Average List / Sale Price Differential | Average Sale Price | Average Land Size | Average $/SQM | Average Days on Market | Number of Sold Properties ▼ |
|---|---|---|---|---|---|---|---|
| Market Averages | - | -$48,228 | $398,230 | 474 m² | $911/SQM | 62 days | 1 |
| Penny Shields | Prdnationwide Ballarat | $ -10,000 | $410,000 | 490 m² | $837/SQM | 7 days | 1 |
| Jason Ingram | Wilson Estate Agents Pty Ltd - Ballarat | $ -15,000 | $400,000 | 428 m² | $935/SQM | 37 days | 1 |
| Lisa Eden-Horvat | Ballarat Property Group | $ -20,000 | $295,000 | 513 m² | $575/SQM | 67 days | 1 |
| Luke Veal | Jens Veal Partners | $ 0 | $475,000 | 446 m² | $1,065/SQM | 11 days | 1 |
| Brooke Reynolds | Jellis Craig Real Estate | $ 47,500 | $625,000 | 475 m² | $1,316/SQM | 3 days | 1 |
| Troy Anwyl | Ballarat Property Group | $ 14,000 | $211,000 | 156 m² | $1,353/SQM | 29 days | 1 |
| Tony Zelencich | McGrath Ballarat | $ -10,000 | $585,000 | 531 m² | $1,102/SQM | 116 days | 1 |
| Dominic Morrison | Ballarat Real Estate Pty Ltd | $ -8,000 | $367,000 | 319 m² | $1,150/SQM | 112 days | 1 |
| Chris McAteer | Buxton Ballarat | $ -10,000 | $485,000 | 388 m² | $1,250/SQM | 71 days | 1 |
| James Nicol | Biggin & Scott Ballarat | $ -43,320 | $601,680 | 322 m² | $1,869/SQM | 161 days | 1 |

Reset

FIG. 20

Agent/Agency Rankings

| Agency | Average List / Sale Price Differential ▼ | Average Sale Price | Average Land Size | Average $/SQM | Average Days on Market | Number of Sold Properties |
|---|---|---|---|---|---|---|
| Jellis Craig Real Estate | $ 47,500 | $625,000 | 475 m² | $1,316/SQM | 3 days | 1 |
| Biggin Scott Ballarat | $ 45,000 | $560,000 | 700 m² | $800/SQM | 6 days | 1 |
| Jens Veal Partners | $ 0 | $475,000 | 446 m² | $1,065/SQM | 11 days | 1 |
| Ballarat Real Estate Pty Ltd | $ -8,000 | $367,000 | 319 m² | $1,150/SQM | 112 days | 1 |
| McGrath Ballarat | $ -10,000 | $585,000 | 531 m² | $1,102/SQM | 116 days | 1 |
| Prdnationwide Ballarat | $ -14,000 | $348,500 | 473 m² | $734/SQM | 18 days | 2 |
| Wilson Estate Agents Pty Ltd - Ballarat | $ -15,000 | $400,000 | 428 m² | $935/SQM | 37 days | 1 |
| Ballarat Property Group | $ -17,000 | $253,000 | 334 m² | $964/SQM | 48 days | 2 |
| Biggin & Scott Ballarat | $ -43,320 | $601,660 | 322 m² | $1,869/SQM | 161 days | 1 |
| Market Averages | -$48,228 | $398,230 | 474 m² | $911/SQM | 62 days | 1 |
| Buxton Ballarat | $ -92,500 | $402,500 | 454 m² | $933/SQM | 115 days | 2 |

FIG. 21

Agent/Agency Rankings

| Agency | Average List / Sale Price Differential | Average Sale Price ▼ | Average Land Size | Average $/SQM | Average Days on Market | Number of Sold Properties |
|---|---|---|---|---|---|---|
| Jellis Craig Real Estate | $ -47,500 | $625,000 | 475 m² | $1,316/SQM | 3 days | 1 |
| Biggin & Scott Ballarat | $ -48,320 | $601,680 | 322 m² | $1,869/SQM | 161 days | 1 |
| McGrath Ballarat | $ -10,000 | $585,000 | 531 m² | $1,102/SQM | 116 days | 1 |
| Biggin Scott Ballarat | $ 45,000 | $560,000 | 700 m² | $800/SQM | 6 days | 1 |
| Jens Veal Partners | $ 0 | $475,000 | 446 m² | $1,065/SQM | 11 days | 1 |
| Buxton Ballarat | $ -92,500 | $402,500 | 454 m² | $933/SQM | 115 days | 2 |
| Wilson Estate Agents Pty Ltd – Ballarat | $ -15,000 | $400,000 | 428 m² | $935/SQM | 37 days | 1 |
| Market Averages | -$48,228 | $398,230 | 474 m² | $911/SQM | 62 days | 1 |
| Ballarat Real Estate Pty Ltd | $ -8,000 | $367,000 | 319 m² | $1,150/SQM | 112 days | 1 |
| Prdnationwide Ballarat | $ -14,000 | $348,500 | 472 m² | $734/SQM | 18 days | 2 |
| Ballarat Property Group | $ -17,000 | $253,000 | 334 m² | $964/SQM | 48 days | 2 |

Reset

FIG. 22

Agent/Agency Rankings

[Agent Rankings] Agency Rankings

| Agency | Average List / Sale Price Differential | Average Sale Price | Average Land Size | Average $/SQM ▼ | Average Days on Market | Number of Sold Properties |
|---|---|---|---|---|---|---|
| Biggin & Scott Ballarat | $ -43,330 | $601,680 | 322 m² | $1,869/SQM | 161 days | 1 |
| Jellis Craig Real Estate | $ -47,500 | $635,000 | 475 m² | $1,316/SQM | 3 days | 1 |
| Ballarat Real Estate Pty Ltd | $ -8,000 | $367,000 | 319 m² | $1,150/SQM | 112 days | 1 |
| McGrath Ballarat | $ -10,000 | $585,000 | 531 m² | $1,102/SQM | 116 days | 1 |
| Jens Veal Partners | $ 0 | $475,000 | 446 m² | $1,065/SQM | 11 days | 1 |
| Ballarat Property Group | $ -17,000 | $253,000 | 334 m² | $964/SQM | 48 days | 2 |
| Wilson Estate Agents Pty Ltd - Ballarat | $ -15,000 | $400,000 | 428 m² | $935/SQM | 37 days | 1 |
| Buxton Ballarat | $ -92,500 | $402,500 | 454 m² | $933/SQM | 115 days | 2 |
| Market Averages | -$48,228 | $398,230 | 474 m² | $911/SQM | 62 days | 1 |
| Biggin Scott Ballarat | $ -45,000 | $560,000 | 700 m² | $800/SQM | 6 days | 1 |
| Prdnationwide Ballarat | $ -14,000 | $348,500 | 472 m² | $734/SQM | 18 days | 2 |

Reset

FIG. 23

Agent/Agency Rankings

Agent Rankings | Agency Rankings

| Agency | Average List / Sale Price Differential | Average Sale Price | Average Land Size | Average $/SQM | Average Days on Market ▼ | Number of Sold Properties |
|---|---|---|---|---|---|---|
| Biggin & Scott Ballarat | $ -40,320 | $601,680 | 323 m² | $1,869/SQM | 161 days | 1 |
| McGrath Ballarat | $ -10,000 | $585,000 | 531 m² | $1,102/SQM | 116 days | 1 |
| Buxton Ballarat | $ -92,500 | $402,500 | 454 m² | $933/SQM | 115 days | 2 |
| Ballarat Real Estate Pty Ltd | $ -8,000 | $367,000 | 319 m² | $1,150/SQM | 112 days | 1 |
| Market Averages | -$48,228 | $398,230 | 474 m² | $911/SQM | 62 days | 1 |
| Ballarat Property Group | $ -17,000 | $253,000 | 334 m² | $964/SQM | 48 days | 2 |
| Wilson Estate Agents Pty Ltd - Ballarat | $ -15,000 | $400,000 | 428 m² | $935/SQM | 37 days | 1 |
| Prdnationwide Ballarat | $ -14,000 | $348,500 | 472 m² | $734/SQM | 18 days | 2 |
| Jens Veal Partners | $ 0 | $475,000 | 446 m² | $1,065/SQM | 11 days | 1 |
| Biggin Scott Ballarat | $ 45,000 | $560,000 | 700 m² | $800/SQM | 6 days | 1 |
| Jellis Craig Real Estate | $ 47,500 | $625,000 | 475 m² | $1,316/SQM | 3 days | 1 |

Reset

FIG. 24

Agent/Agency Rankings

| Agency | Average List / Sale Price Differential | Average Sale Price | Average Land Size | Average $/SQM | Average Days on Market | Number of Sold Properties |
|---|---|---|---|---|---|---|
| PRDnationwide Ballarat | $ -14,000 | $348,500 | 472 m² | $734/SQM | 18 days | 2 |
| Buxton Ballarat | $ -92,500 | $402,500 | 454 m² | $833/SQM | 115 days | 2 |
| Ballarat Property Group | $ -17,000 | $253,000 | 334 m² | $964/SQM | 48 days | 2 |
| Market Averages | -$48,228 | $398,230 | 474 m² | $911/SQM | 62 days | 1 |
| Biggin Scott Ballarat | $ 45,000 | $560,000 | 700 m² | $800/SQM | 6 days | 1 |
| Wilson Estate Agents Pty Ltd - Ballarat | $ -15,000 | $400,000 | 428 m² | $935/SQM | 37 days | 1 |
| Jens Veal Partners | $ 0 | $475,000 | 446 m² | $1,065/SQM | 11 days | 1 |
| McGrath Ballarat | $ -10,000 | $585,000 | 531 m² | $1,102/SQM | 116 days | 1 |
| Ballarat Real Estate Pty Ltd | $ -8,000 | $367,000 | 319 m² | $1,150/SQM | 112 days | 1 |
| Jellis Craig Real Estate | $ 42,500 | $625,000 | 475 m² | $1,316/SQM | 3 days | 1 |
| Biggin & Scott Ballarat | $ -43,320 | $601,680 | 322 m² | $1,869/SQM | 161 days | 1 |

FIG. 25

Agent/Agency Rankings

| Agent | Agency | Average List / Sale Price Differential | Average Sale Price | Average Land Size | Average $/SQM ▼ | Average Days on Market | Number of Sold Properties |
|---|---|---|---|---|---|---|---|
| James Nicol | Biggin & Scott Ballarat | -$43,320 | $601,680 | 322 m² | $1,869/SQM | 161 days | 1 |
| Troy Anwyl | Ballarat Property Group | $-14,000 | $213,000 | 156 m² | $1,353/SQM | 29 days | 1 |
| Brooke Reynolds | Jellis Craig Real Estate | $47,500 | $625,000 | 475 m² | $1,316/SQM | 3 days | 1 |
| Chris McAteer | Buxton Ballarat | $-10,000 | $485,000 | 388 m² | $1,250/SQM | 71 days | 1 |
| Dominic Morrison | Ballarat Real Estate Pty Ltd | $-8,000 | $367,000 | 319 m² | $1,150/SQM | 112 days | 1 |
| Tony Zelencich | McGrath Ballarat | $-10,000 | $585,000 | 531 m² | $1,102/SQM | 116 days | 1 |
| Luke Veal | Jens Veal Partners | $0 | $475,000 | 446 m² | $1,065/SQM | 11 days | 1 |
| Jason Ingram | Wilson Estate Agents Pty Ltd - Ballarat | $-15,000 | $400,000 | 428 m² | $935/SQM | 37 days | 1 |
| Market Averages | - | -$48,228 | $398,230 | 474 m² | $911/SQM | 62 days | 1 |
| Penny Shields | Prdnationwide Ballarat | 10,000 | $410,000 | 490 m² | $837/SQM | 7 days | 1 |
| Lisa Eden-Horvat | Ballarat Property Group | $-20,000 | $295,000 | 513 m² | $575/SQM | 67 days | 1 |

FIG. 26

Transaction History For James Nicol (Biggin & Scott Ballarat)

| Property Type | Address | Sale Date | List / Sale Price Differential | Sale Price | List Price | Land Size | $/SQM | Days on Market |
|---|---|---|---|---|---|---|---|---|
| House | 1 Ajax Street Newington VIC 3350 | 2019-09-30 | $43,320 | $601,680 | $645,000 | 322 m² | $1,869 | 163 days |

252 254 256 258 260 262 264 266

Full Transaction History

| State | Suburb | Address | Land Size | List Price | Date Listed |
|---|---|---|---|---|---|
| VIC | Ballarat | 4 Kent Street, Ballarat Central VIC 3350 | N/A | $750,000 - $805,000 | 2020-10-01T04:23:14Z |
| VIC | Ballarat | 86A Victoria Street, Ballarat East VIC 3350 | N/A | $600,000 - $650,000 | 2020-10-01T04:22:09Z |
| VIC | Ballarat | 057 Lydiard Street North, Soldiers Hill VIC 3350 | N/A | $475,000 - $519,000 | 2020-09-30T01:50:11Z |
| VIC | Ballarat | 5 Tristan Cove, Sebastopol VIC 3356 | N/A | $250,000 - $260,000 | 2020-09-30T01:50:36Z |
| VIC | Ballarat | 305 Gladstone Street, Maryborough VIC 3465 | N/A | $160,000 | 2020-08-09T05:57:43Z |
| VIC | Ballarat | 27 Burnbank Street, Lake Wendouree VIC 3350 | N/A | SOLD - Price Withheld | 2020-08-26T05:29:10Z |
| VIC | Ballarat | 25 Burnbank Street, Lake Wendouree VIC 3350 | N/A | SOLD - Price Withheld | 2020-08-26T04:09:37Z |
| VIC | Ballarat | 16 Otway Street South, Ballarat East VIC 3350 | N/A | $250,000 - $270,000 | 2020-08-20T04:07:56Z |
| VIC | Ballarat | 328 Armstrong Street North, Soldiers Hill VIC 3350 | N/A | SOLD - $599,000 | 2020-08-19T06:20:55Z |
| VIC | Ballarat | 403 Ripon Street South, Ballarat Central VIC 3350 | N/A | SOLD - $555,000 | 2020-07-14T04:33:19Z |
| VIC | Ballarat | 214 Lyons Street South, Ballarat Central VIC 3350 | N/A | SOLD - $749,000 | 2020-06-26T00:41:01Z |
| VIC | Ballarat | 614 Armstrong Street North, Soldiers Hill VIC 3350 | N/A | SOLD - $540,000 | 2020-06-25T00:08:22Z |
| VIC | Ballarat | 912 Lydiard Street North, Ballarat North VIC 3350 | N/A | $450,000 - $480,000 | 2020-06-23T06:01:04Z |
| VIC | Ballarat | 60 Lulven Street, Nerrina VIC 3350 | N/A | $575,000 - $600,000 | 2020-06-18T03:35:52Z |
| VIC | Ballarat | 708 Ascot Street South, Redan VIC 3350 | N/A | $340,000 - $375,000 | 2020-06-18T23:05:11Z |
| VIC | Ballarat | 9 Ron Court, Canadian VIC 3350 | N/A | SOLD - $485,000 | 2020-06-04T05:29:05Z |
| VIC | Ballarat | 5A Marakoff Street, Newington VIC 3350 | N/A | $420,000 - $450,000 | 2020-06-03T03:49:18Z |
| VIC | Ballarat | 317 Peel Street North, Black Hill VIC 3350 | N/A | SOLD - $200,000 | 2020-06-03T03:47:25Z |
| VIC | Ballarat | 394A Macarthur Street, Soldiers Hill VIC 3350 | N/A | SOLD - $575,000 | 2020-05-27T03:41:40Z |
| VIC | Ballarat | 2/2 Finley Court, Mount Clear VIC 3350 | N/A | SOLD - $265,000 | 2020-05-21T00:18:12Z |
| VIC | Ballarat | 1002a Urquhart Street, Ballarat North VIC 3350 | N/A | SOLD - $449,000 | 2020-05-14T01:53:40Z |
| VIC | Ballarat | 108 Ripon Street South, Ballarat Central VIC 3350 | N/A | SOLD - $580,000 | 2020-05-04T23:38:31Z |
| VIC | Ballarat | 504 Howard Street, Soldiers Hill VIC 3350 | N/A | SOLD - $717,000 | 2020-04-29T23:46:47Z |
| VIC | Ballarat | 204 Cresetown Crescent, Soldiers Hill VIC 3350 | N/A | SOLD - $555,000 | 2020-04-21T03:37:29Z |
| VIC | Ballarat | 604 Howard Street, Soldiers Hill VIC 3350 | N/A | SOLD - $620,000 | 2020-04-16T03:39:38Z |

Load More Transactions — 268

*Currently displaying 25/537 transactions*

FIG. 27

BEST AGENT ALGORITHM

302 — AVERAGE (SALE PRICE − LIST PRICE)

IF AGENT/AGENCY AVERAGE
- \> AVERAGE TO NOMINATED PROPERTY TYPE THEN VALUE = +1
- ≈ AVERAGE TO NOMINATED PROPERTY TYPE THEN VALUE = 0
- < AVERAGE TO NOMINATED PROPERTY TYPE THEN VALUE = −2

304 — AVERAGE SALE PRICE

IF AGENT/AGENCY AVERAGE
- \> AVERAGE TO NOMINATED PROPERTY TYPE THEN VALUE = +1
- ≈ AVERAGE TO NOMINATED PROPERTY TYPE THEN VALUE = 0
- < AVERAGE TO NOMINATED PROPERTY TYPE THEN VALUE = −1

306 — AVERAGE $ PER SQUARE METRE

IF AGENT/AGENCY AVERAGE
- \> AVERAGE TO NOMINATED PROPERTY TYPE THEN VALUE = +1
- ≈ AVERAGE TO NOMINATED PROPERTY TYPE THEN VALUE = 0
- < AVERAGE TO NOMINATED PROPERTY TYPE THEN VALUE = −1.5

308 — AVERAGE DAYS ON MARKET

IF AGENT/AGENCY AVERAGE
- \> AVERAGE TO NOMINATED PROPERTY TYPE THEN VALUE = −2
- ≈ AVERAGE TO NOMINATED PROPERTY TYPE THEN VALUE = 0
- < AVERAGE TO NOMINATED PROPERTY TYPE THEN VALUE = +1.5

310 — NUMBER OF PROPERTIES SOLD

IF AGENT/AGENCY AVERAGE
- \> AVERAGE TO NOMINATED PROPERTY TYPE THEN VALUE = +1
- ≈ AVERAGE TO NOMINATED PROPERTY TYPE THEN VALUE = 0
- < AVERAGE TO NOMINATED PROPERTY TYPE THEN VALUE = −1

312 — ALL SUBURBS NUMBER OF PROPERTIES SOLD

IF AGENT/AGENCY AVERAGE
- \> AVERAGE TO NOMINATED PROPERTY TYPE THEN VALUE = +1
- ≈ AVERAGE TO NOMINATED PROPERTY TYPE THEN VALUE = 0
- < AVERAGE TO NOMINATED PROPERTY TYPE THEN VALUE = −1

314 — PROPERTIES SOLD TO LISTED PERCENTAGE

IF AGENT/AGENCY AVERAGE
- \> AVERAGE TO NOMINATED PROPERTY TYPE THEN VALUE = +2
- ≈ AVERAGE TO NOMINATED PROPERTY TYPE THEN VALUE = +1
- < AVERAGE TO NOMINATED PROPERTY TYPE THEN VALUE = −2

FIG. 28B

SYSTEM AND METHOD FOR FINDING AN OPTIMAL REAL ESTATE AGENT OR AGENCY

PRIORITY INFORMATION

Pursuant to 35 U.S.C. § 119(a), this application claims the benefit of earlier filing date and right of priority to Australian Provisional Patent Application Number 2020904124, filed on Nov. 11, 2020. The entire content of Australian Provisional Patent Application Number 2020904124, filed on Nov. 11, 2020, is hereby incorporated by reference.

BACKGROUND

Traditionally when people are searching for a real estate agent or agency when selling their property, they contact real estate agencies either by telephone, by email or looking at the website of that agency. It could also be in response to an advertisement or through word-of-mouth by people that they know have used particular agents in the past.

Statistics of a real estate agency are available from certain websites to determine what properties those agents have sold in the past, the price and date of sale of the properties. There are also maps available through the internet that show properties for sale in a particular area, for example a radius from a nominated address and who the agent or agency was when selling a particular property. However there is nothing that links different agents or agencies for a user to compare against one another. There is currently no process that exists for a potential vendor to find an agent or agency by comparing their record of statistics of sales against other agents or agencies based on a number of parameters.

Accordingly, it is desirable to overcome one or more of the above disadvantages by providing a method and system that enables a prospective vendor to make a comparison between agents and agencies for a property in a particular area and to be able to make a decision on what they consider to be the best agent or agency to use based on a number of parameters to sell their property.

BRIEF DESCRIPTION OF THE DRAWINGS

The drawings are only for purposes of illustrating various embodiments and are not to be construed as limiting, wherein:

FIG. 9 is a screenshot of confirmation of the address details and details on the sale history of that property;

FIG. 11 is a screenshot showing a selection of search criteria such as the number of bedrooms, bathrooms, and other characteristics of a house which is ready to submit by the user;

FIG. 12 is a screenshot showing a user that has submitted search criteria details and showing the system is searching for relevant properties matching the criteria;

FIG. 13 is a screenshot showing current market averages for the type of property and criteria about the property type;

FIG. 14 is a screenshot displaying the ranking of agents against the market average based on the search criteria input by the user from FIG. 11;

FIG. 16 is a screenshot showing a list of agent rankings in relation to the average difference between the list price and the sale price of the relevant property type sold by the agents listed in the agent rankings and compared to the market average;

FIG. 17 is a screenshot showing a list of agent rankings in relation to the average sale price of the relevant property type sold by the agents listed in the agent rankings and compared to the market average;

FIG. 18 is a screenshot showing a list of agent rankings in relation to the average price per square metre of the relevant property type sold by agents listed in the agent rankings and compared to the market average;

FIG. 19 is a screenshot showing a list of agent rankings of average days on the market that properties of the selected type have been when sold by the agents listed in the agent rankings in the screenshot and compared to the market average;

FIG. 20 is a screenshot of a list of agent rankings in relation to the number of properties of the selected type sold by each agent listed in the agent rankings and compared to the market average;

FIG. 21 is a screenshot of a list of agency rankings in terms of the average difference between the sale price and the list price of the selected property type and compared to the market average;

FIG. 22 is a screenshot showing a list of agency rankings in relation to the average sale price of the selected property type sold by the listed agencies and compared to the market average;

FIG. 23 is a screenshot showing a list of agency rankings in relation to the average cost or sale price per square metre of the selected property type sold by the listed agencies and compared to the market average;

FIG. 24 is a screenshot of a list of agency rankings based on the average days on the market of the selected property type sold by the listed agencies and compared to the market average;

FIG. 25 is a screenshot of a list of agency rankings in relation to number of properties of the selected type sold by each listed agency and compared to the market average;

FIG. 26 is a screenshot similar to FIG. 18 but showing a list of the average sale price per square metres of the selected property type sold by the listed agents but with the top agent highlighted and compared to other agents and the market average;

FIG. 27 is a screenshot of all the details of transaction history for the highlighted agent from FIG. 26;

FIG. 28B is a block diagram showing the determination of values assigned to an agent or agency based on a number of parameters;

DETAILED DESCRIPTION OF THE EMBODIMENTS

Figure 1:
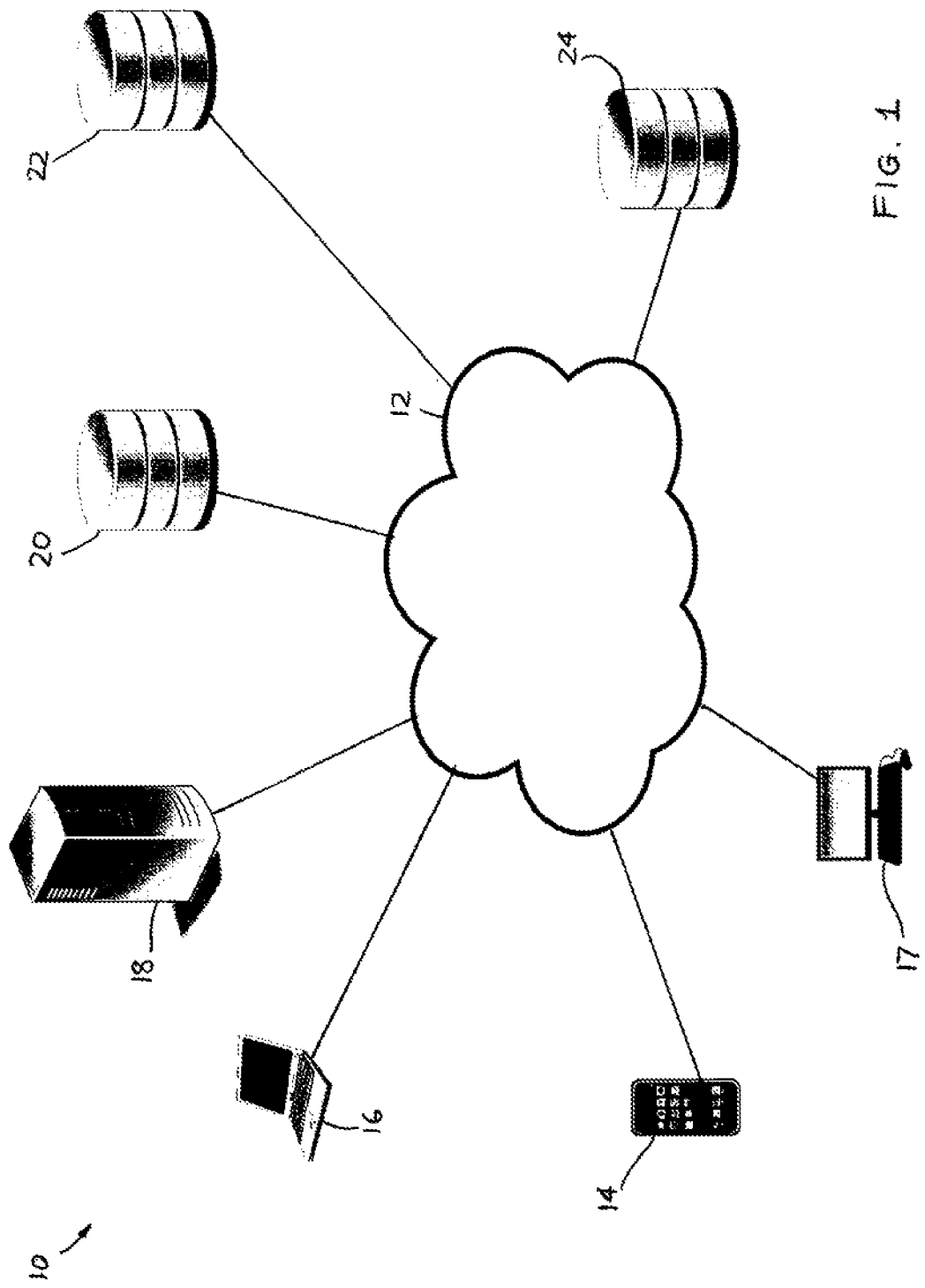
FIG. 1 is a block diagram of a communications system which enables the invention to be carried out.

Referring to FIG. 1 there is shown a system 10 which is used to enable a user to select the best or optimal real estate agent or real estate agency within a predefined distance from a selected property, in order to potentially sell his or her own property. A real estate agency is a company generally comprising one or more real estate agents. The system 10 includes a number of devices that use the internet 12 including a mobile device of a user, such as a mobile telephone 14, laptop 16 or desktop 17 that is able to communicate with server 18 over the internet 12. The server 18 is provided by the owner of the system 10 which makes the comparison between various agents and between various real estate agencies.

It is done through the use of multiple databases, such as 20, 22 and 24 where software, including computer program instructions, resident at the server 18 is used to access various specific pieces of information from the databases 20, 22 and 24 in order to provide a summary of rankings of the best/optimal agents or best/optimal agencies in a geographical area where the person wishes to sell a property. The databases 20, 22 and 24 are non-public or proprietary. The databases 20 to 24 use APIs or Application Program Interfaces that require payment or subscription to use. The databases contain all information pertaining to property sales in a jurisdiction, for example a city, state or country.

Figure 2:
FIG. 2 is a screenshot of a page of a website that enables a user to log into a website and determine an optimum agent or agency to use to sell a property.
Figure 3:
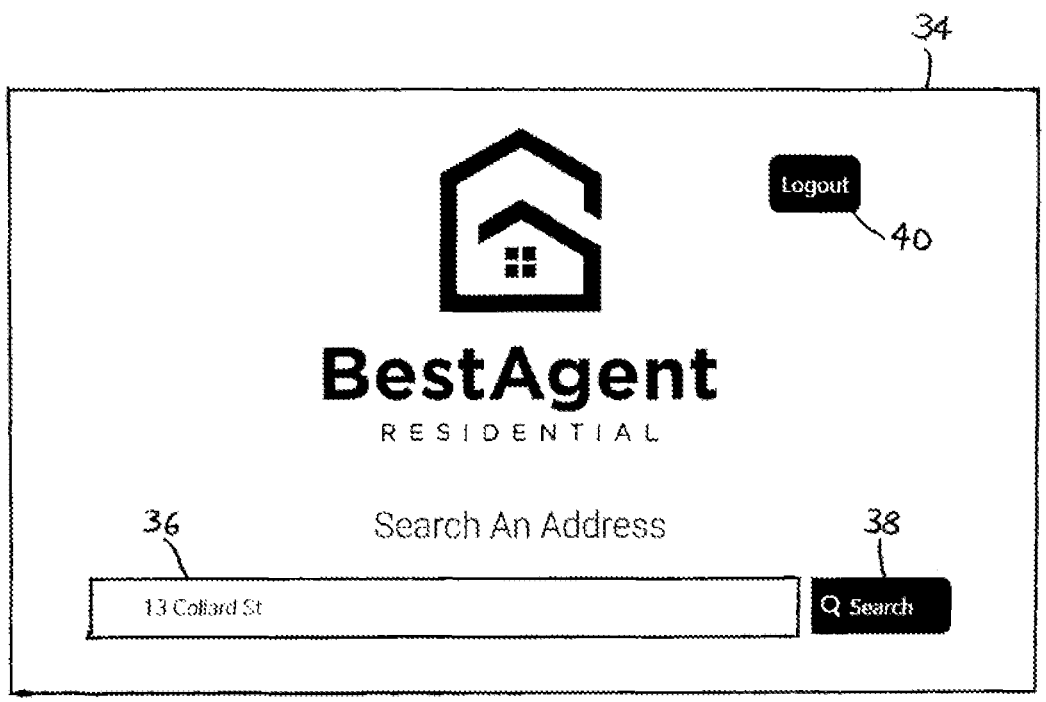
FIG. 3 is a screenshot on the same website of a page that enables the user to enter a target property address.

With reference to FIG. 2 there is shown a screen 26 from a website called BestAgent. It includes an email address box 28 and also password box 30 for a registered user to respectively insert an email address and a password to log in to the website by clicking button 32. Once a registered user is logged into the website, screen 34 shown in FIG. 3 returns with a property address box 36 in which a property address is entered which is of interest to the user and then search button 38 is clicked to confirm and retrieve details about the property at that address. If the user wishes to logout of the system, button 40 is clicked.

Figure 4:
FIG. 4 is a screenshot enabling a number of addresses to be listed in a dropdown box to be selected by the user.
Figure 5:
FIG. 5 is a screenshot that shows a user selecting a target property address.
Figure 6:
FIG. 6 is a screenshot showing a process of validation of the entered address.
Figure 7:
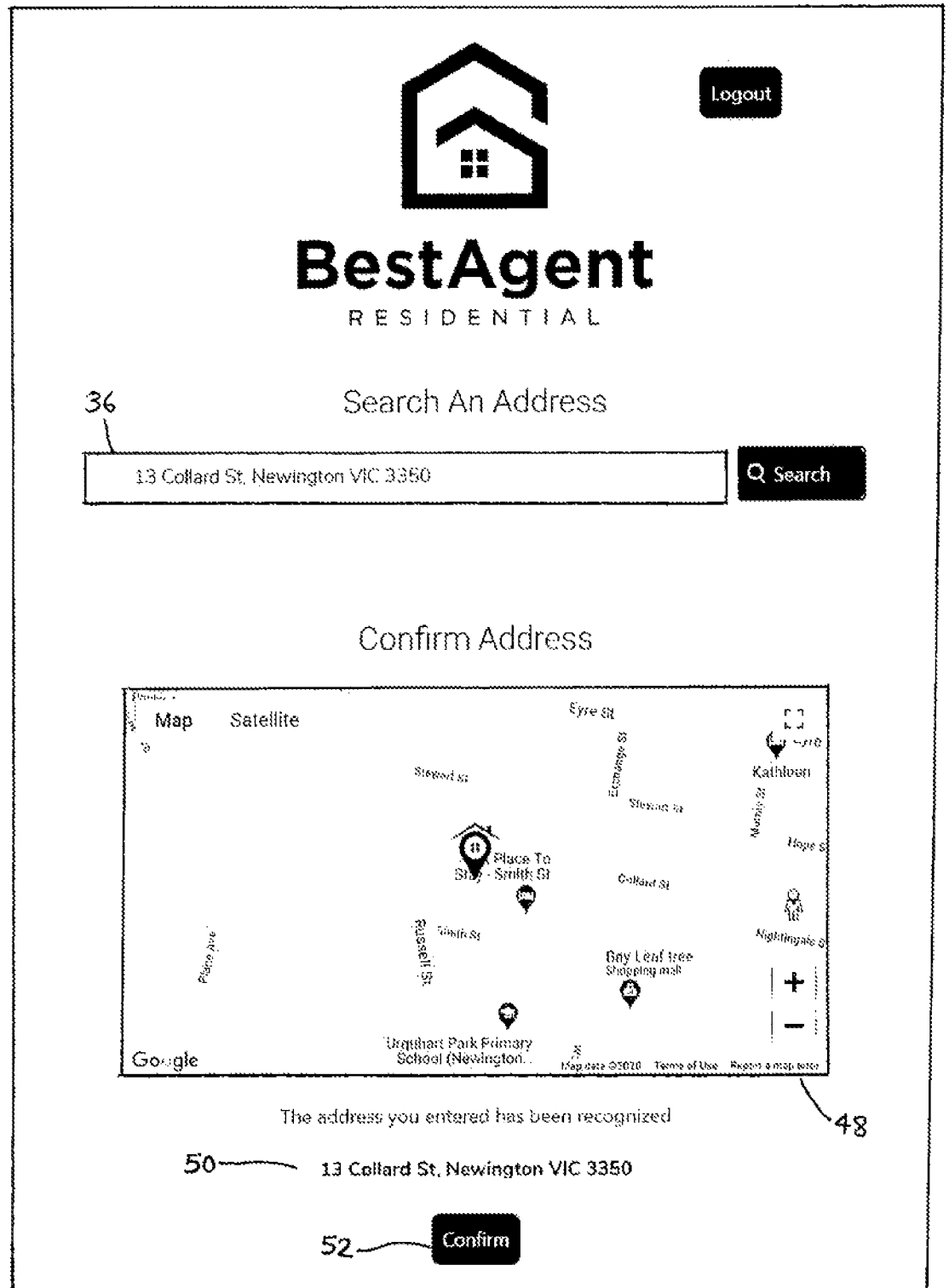
FIG. 7 is a screenshot showing the address on a map.
Figure 8:
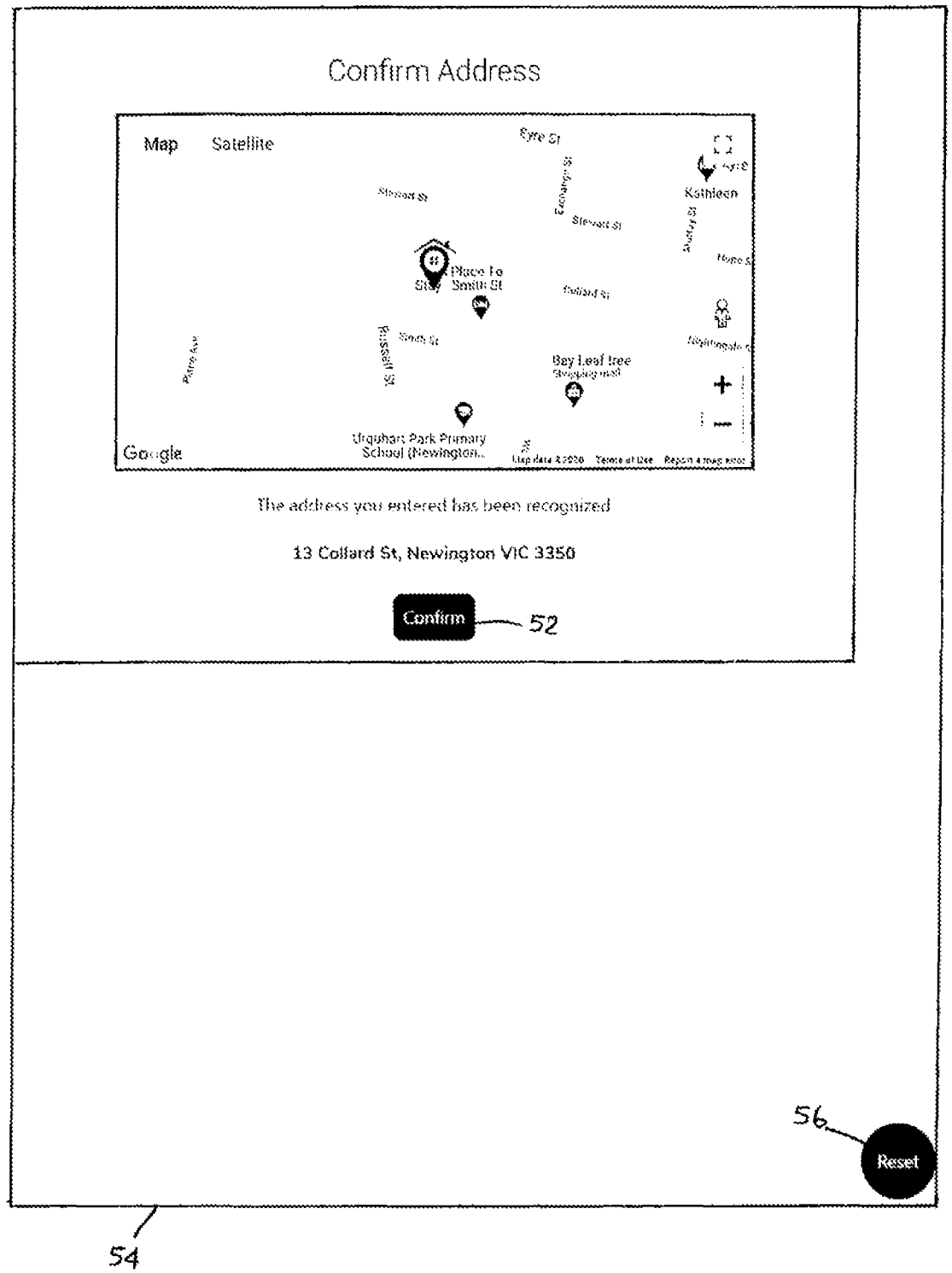
FIG. 8 is a screenshot inviting the user to confirm the address entered or to enter a new address.

In FIG. 4 a number of addresses appear from a dropdown box 42 from the search engine, generally supplied by a Google maps API. The user then selects the required target property address from the address options in box 42 for which the target address is shown in FIG. 5 in box 36. In FIG. 6 the search engine conducts the search as indicated by the icon 44 and when the address has been validated by that system and recognised, the details of the location of the target address is retrieved and then displayed on a map 48 to the user on screen 46 in FIG. 7 with options to view the area around the map. At location 50 on screen 46 the target address is displayed and the user then confirms that address by clicking on confirm button 52. In FIG. 8 the user can confirms that that is the correct address by clicking button 52. Alternatively, if the user wishes to search another property at a new address the user can click on reset button 56.

When the user confirms the target property address, details associated with that address are displayed on screen 58 in FIG. 9. The particular parameters or characteristics that are displayed include the property type 60, the number of bedrooms 62, the number of bathrooms 64, the number of car spaces at the property 66, the property's land size 68, the date of the last sale of that property 70, the list price 72, the sale price 74, the difference between the list price and the sale price 76, the amount of dollars or cost per square metre 78, the number of days the property was on the market 80, the sales agent 82 and the sales agency 84. Each of these parameters 60-84 are supplied through the databases 20, 22 and 24 so that the data provided ensures the veracity of the actual data extracted from those databases. If there is conflicting data, software or computer programs at server 18 selects the data set with the most congruence. If there is no congruence then the data shows as N/A.

Figure 10:
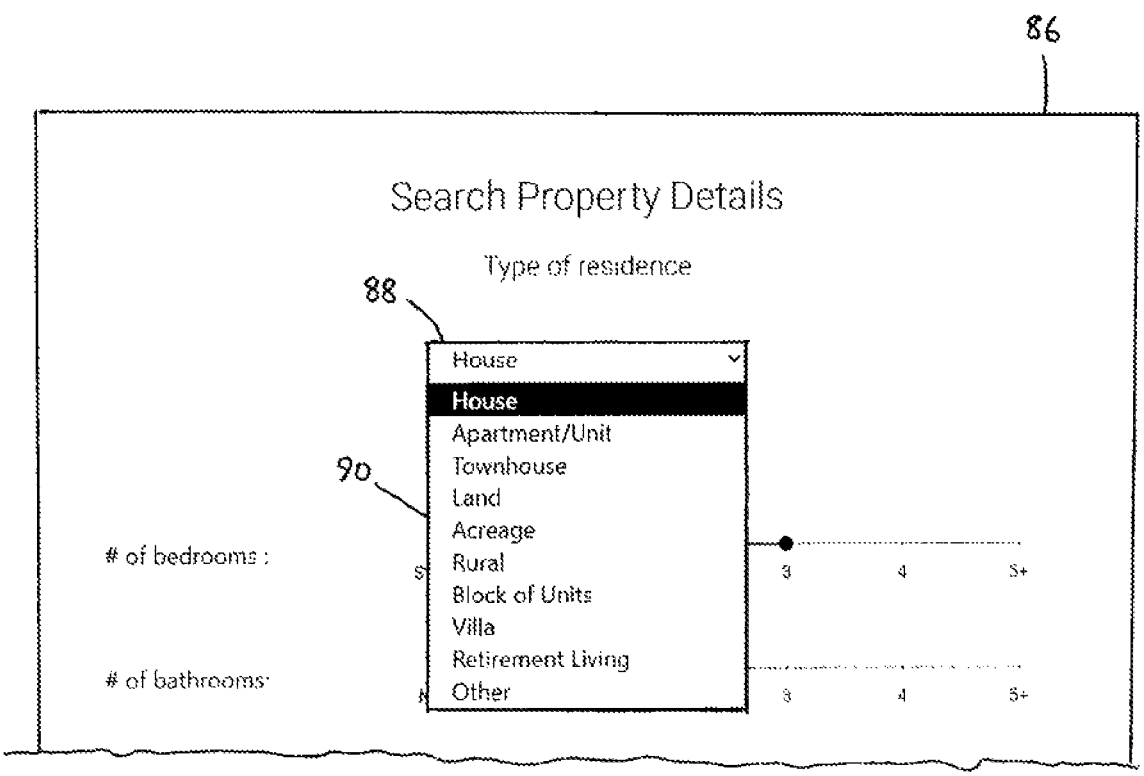
FIG. 10 is a partial screenshot with a dropdown box to enter search details of a particular property such as a type of house, apartment or townhouse.

In FIG. 10 there is shown a screen 86 that displays the search property details. The search property details page allows a user to adjust their search parameters that are comparable against the target property address already entered. The search property details screen 86 also allows the user to select from several residence types at box 88 through a dropdown box 90. The types of properties or residences to choose from include house, apartment/unit, townhouse, land, acreage, rural, blocks of units, villa, retirement living or any other type of property not already described.

Figure 11:
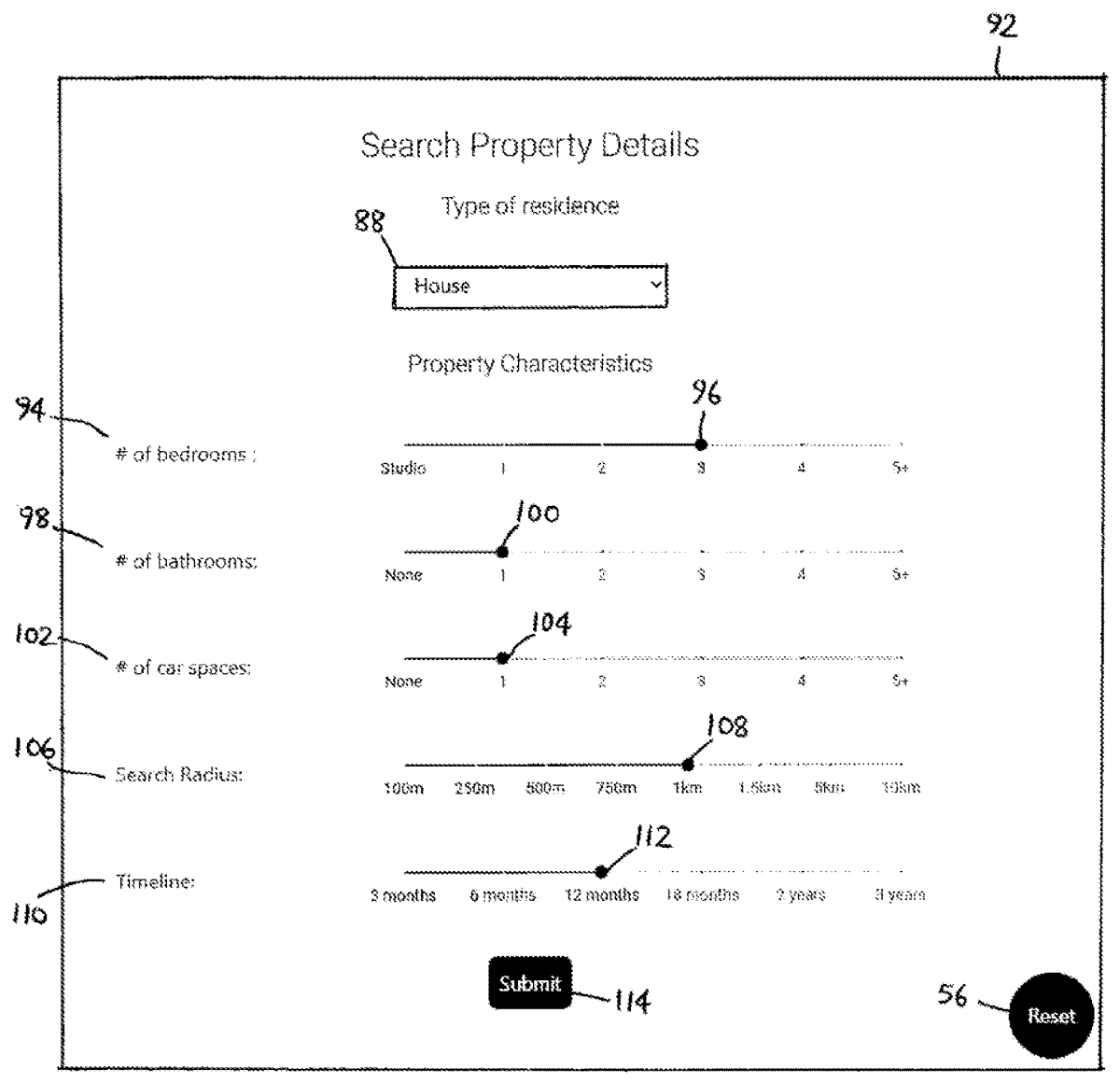

When the user selects the property type on screen 86, he/she can change other parameters to be described. The search property details page has the property characteristics which are default parameters and they are identical to the ones that were relevant to the selected target property. For example, at location 94 there is shown the number of bedrooms required on screen 92 in FIG. 11 under the category 'House' to search on, at location 98 the number of bathrooms, at location 102 the number of car spaces, at location 106 the search radius from the selected property and at location 110 the timeline (or time period over which properties have been sold), for the search. The user is able to select or change these property characteristics for searching if required. For example, to change the number of bedrooms a slide 96 is used to select from between a studio and a house with up to five or more bedrooms. A slide 100 is used to select the number of bathrooms from none to more than five.

A slide 104 can be used to select any number of car spaces from none up to more than five. A further slide 108 is used to define the search radius of houses from the selected property from 100 metres away or to a 10 km radius from the selected property. A slide 112 is used to select the time duration or period of the sale of houses within that radius and this can be from three months up to three years. Once the user is satisfied with his or her selections then he/she clicks on submit button 114. The person can reset their preferences or look for another property to base their parameters on by clicking button 56. On clicking the submit button 114, the software at server 18 starts the process of acquiring the results in that search radius and this is shown by icon 116 is FIG. 12.

Referring to FIG. 13 there is shown a screen 118 which displays the current market averages which have been collected, collated, compiled and averaged from the previously nominated search property details and characteristics page which is shown in FIG. 12 on screen 92. The particular current market averages that are displayed are for the property type being a house, having three bedrooms, one bathroom, one car space, a search radius of one kilometre over the previous 12 months. These are all shown on the first row 117 on screen 118 and beneath that a second row 119 shows the average sale price, the average listed price to sale price differential, the average land size, the average price per square metre and the average days a house has been on the market.

Referring to FIG. 14 there is shown screen 120 which provides a list of agents in order of the average sale price for properties of the type input by the user. Button and column 128, which discloses in order a list of the average sale price of that property type from highest to lowest, has been clicked and the market averages are shown at row 138 lower down in the list. The agents are listed in column 122, the agency that the agent works for is listed in column 124, the average differential between the listed price and the sale price is listed in column 126. The average land size is listed in column 130, the average price per square metre is listed in column 132, the average days that a property has been on the market is listed in column 134 and the number of sold properties for the particular agent is listed in column 136. Each of the columns 122 to 134 can be clicked on to place the particular characteristic or parameter in order.

By clicking buttons 121 and 123 the user can toggle between agent rankings (button 123) as is shown on screen 120 and which is highlighted, and also the agency rankings (button 121). By clicking on any one of the titles in heading row 127 this will make the program retrieve the results in order based on that particular characteristic. For example if the average number of days on the market at column 134 is clicked then the program will re-order the table shown in screen 120 to reflect the agent that has had a property for the least number of days on the market, shown at the top of the list, and the other agents ranked in order.

Figure 15:
FIG. 15 is a screenshot that shows a pair of buttons through which the user can toggle in order to obtain agent rankings and agency rankings.

FIG. 15 shows screen 130 which displays the buttons 121 and 123 previously referred to where a user can toggle between viewing agent rankings and agency rankings.

Shown in FIG. 16 is screen 140 which has ranked agents in column 122 based on the average price differential between the list price and the sale price in column 126. It is accessed by clicking on button and column 126. In FIG. 17, which is similar to FIG. 14, there is shown screen 120 that shows the ranking of agents based on the user clicking on button 128 to determine the average sale price from highest to lowest and compared to the market averages at row 138.

In FIG. 18 there is shown screen 160 which, after the user has clicked on button 132, shows in that column the results of averages of those agents that have sold properties based on the most to least price/dollars per square metre. The market averages, of the average cost per square metre, is shown at row 162 for the property type (house) and the characteristics of that property, for example three bedrooms.

With reference to FIG. 19 there is shown screen 170 which is displayed after the user has clicked on button 134 to determine the ranking of agents based on the average days on the market of properties that they have sold, based on the previous characteristics from least to most number of days. This is compared to the market averages shown at row 172. In FIG. 20 there is shown screen 180 which is displayed after the user has clicked on button 136 to determine the ranking from highest to lowest of the number of properties sold by a particular agent. The market averages shown at row 182 is the same as all the other agents listed, as each agent has only sold one property but this is only indicative of one particular example.

With reference to FIG. 21 there is shown screen 190 where the user has used the button 121 to toggle from the agent rankings button 123 to the agency rankings, now with button 121 highlighted. The user then has clicked on button 126 to display in that column rankings of agencies in column 124 that have the highest to the lowest price differential on average between the list price and the sale price of the selected properties. The market averages is shown in row 192 for comparison.

In FIG. 22 there is shown screen 200 which is displayed after the user has clicked on button 128 to show a ranking of agencies in column 124 from the highest to the lowest average sale price of the properties. For comparison the market averages is shown in row 202.

Referring to FIG. 23 there is shown screen 210 which displays agency rankings in column 124 after the user has clicked on button 132 which is the average price per square metre of the selected property type. The agencies are ranked based on the highest value per square metre and down to the lowest value per square metre. The market averages in average cost or price per square metre is shown in row 212.

Referring to FIG. 24 there is shown screen 220 which is displayed after the user has clicked on button 134 for the program to determine a ranking of agencies (as shown in column 124) based on the average number of days on the market for the particular properties having the characteristics referred to earlier. Thus the agents are ranked from the highest number of days the property, under their control, has been on the market, down to the lowest number of days. The market averages are shown at row 222.

With reference to FIG. 25 there is shown screen 230 which is displayed after the user has clicked on button 136 to determine the number of properties sold by each of the agencies listed in column 124. These are ranked from the highest number of properties sold to the lowest number of properties sold. The market averages for the number of properties sold for a particular property type and its characteristics is displayed at row 232.

In FIG. 26 there is shown screen 240 which displays from highest to lowest the ranking of agents in column 122 based on the average cost/price per square metre of the property type of interest, being a house with the characteristics shown in FIG. 13. The market averages are displayed at row 244. When a user clicks on an individual agent, in this case James Nicol, at row 242, there is provided the detailed history of that particular agent shown in FIG. 27 which is displayed on screen 250. The agent individual sales transactions result history is received from two separate databases which ensure veracity and congruence. The attributes viewed from the individual sales transaction history shown in screen 250 are the street address at 252, the date of the sale at column 254, the differential price between the list price and the sale price at column 256, the sale price at column 258, the list price at column 260, the land size at column 262, the price per square metre at column 264 and the number of days the property was on the market at column 266. More transactions for that particular agent can be accessed by clicking on button 268.

Figure 28A:
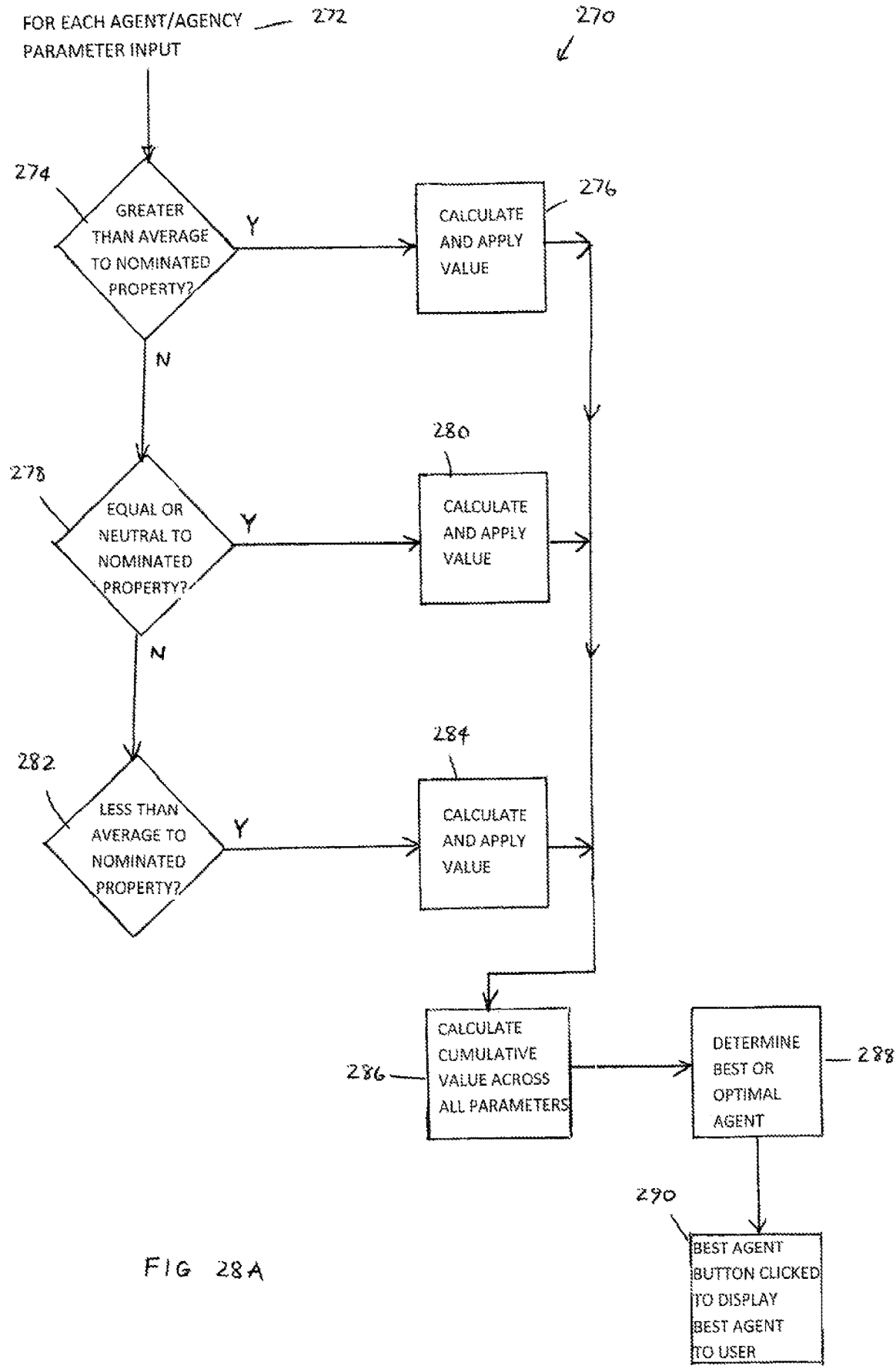
FIG. 28A is a flow diagram showing the steps involved in how the optimal agent is determined from a computer-based system according to the invention.

With reference to FIGS. 28A and 28B there is shown a flow diagram and block diagram respectively of how the best or optimal agent is determined from the computer program resident at the server 18. When the screen 250 is shown depicting the transaction history for a particular agent, a "Best Agent" button appears on the left-hand side of the screen 250 after such a selection of the transaction history. The computer program runs this particular algorithm in order to arrive at the best agent.

Referring to FIG. 28A there is shown flow diagram 270 which starts with the step 272 whereby for each agent or agency the various parameters to search on are retrieved from databases 20, 22 and 24 such as the average differential between the listed price and sale price, or the average sale price, or the average days on the market for each of the properties that the agent or agencies has dealt with. This information is then input to a decision box 274 to determine if the particular parameter of the agent or agency is greater than the average against the average to the property nominated. The particular parameter to do with the average days on the market will not work through this particular flow chart 270 but will be described separately Therefore, if the average of the agent/agency is greater, then the process moves to step 276 where the program initiates a calculation and applies a particular value, such as +1 (positive one), to the agent/agency and is stored in the memory unit at server 18. If the average of the particular parameter for the agent/agency is not greater than the average to the nominated property then the process moves to decision box 278. At decision box 278 if the identified parameter average is approximately equal to the average of the nominated property then the process moves to 280 where a calculation is made and the application of a particular value, such as zero points is applied and is stored in the memory unit at server 18. If it does not meet the criteria at 278 then the process moves to decision box 282 where it is determined if the average is less than the average to the nominated property which, in general, it should be. The process then moves to step 284 where a calculation is made and a typical value applied and is stored in the memory unit at server 18, which is generally negative such as (−1) or negative one, as this is not a particularly good average for the agent or agency. Once the values have been calculated they are all added for each agent/agency from process steps 276, 280 and 284 in step 286. An accumulative value is calculated for each agent/agency based on a weighted aggregate of the combined parameters at step 288 and the most optimal agent is determined by the computer program, based on the accumulative values. The best agent/agency has the highest aggregate across all the parameters. This is then displayed to the user at step 290 through the "Best Agent" button.

In the case of the average days on the market, the process is reversed so that if the agent's average number of days on the market is less than the average to the property nominated, then the process moves to step 282 where at step 284 a positive value is applied, such as positive one (+1). If the agent's average number of days on the market is neutral or close to the average of the property nominated then the process would move to step 278 and a calculation made at 280 and a value such as zero applied. If the agent's average number of days on the market is greater than the average to the property nominated then this is a worst case scenario where the value is applied at box 276 and is usually a negative value, such as negative one (−1) as there are excessive days on the market which is not good for any property.

Once the Best Agent algorithm is run and the Best Agent displayed to the user, then a "Best Time to Sell" button appears on screen 250 in its place. For the Best Time to Sell algorithm, the computer program operates as follows. The highest prices achieved, per square metre, with the lowest days on the market was when X amount of similar properties were for sale in the Y suburb, over a time period such as the past twelve months. The lowest prices achieved, per square metre, with the highest days on the market was when Z amount of similar properties were for sale in the Y suburb over a time period such as the past twelve months. Ideally, to achieve the highest price possible, one should sell a property when there are less than Z amount of similar properties for purchase over the next two months. This is an example of using the per square meter dollar amount parameter. Through every stage of the process, the computer program has access is two to three databases, to determine the Best Agent, to ensure congruence and veracity of the inputs and outputs.

Referring to FIG. 28B there is shown a block diagram 300 of various parameters used to determine the amount of points of the value applied to an agent or agency. For example, at process 302 a calculation of the average list price to sale price is determined. If the agent average list price to sale price differential is greater than the average to the property nominated then the value applied by the computer program is positive one (+1) or some other positive value. If the agent's average list price to sale price differential is neutral compared to the average to the property nominated, then the value applied by the computer program is zero. Where that average is less than that of the property nominated then the value applied is negative 2 (−2) or some other negative value.

At step 304 there is shown the average sale price. Therefore if the agent's average sale price differential is greater than the average to the property nominated then the value assigned by the computer program is positive one. If it is neutral or approximately equal to the average of the property nominated, then zero is assigned as the value. Where the average sale price is less than that of the property nominated, for the type of property, then the value applied is negative one.

At step 306 there is shown the average price per square meter. Therefore if the agent's average price per square meter is greater than the average applied to the property that is nominated, then the value is positive one. If the average is approximately equal to or neutral to the average of the property nominated, then the value applied by the computer program is zero. Where it is less than the average nominated to the property then the value applied is negative 1.5.

At step 308 there is shown the average number of days properties have been on the market. This is slightly different in that if the average days on the market of the agent are less than that of the property nominated, then a value of (+1.5) is applied. If it is approximately equal to the average of the property nominated then zero is applied or if the agent's average days on the market is greater than that of the property nominated, then the value assigned is negative two (−2).

Regarding the number of properties sold at step 310, if the agent's average number of properties sold is greater than that to the property nominated then a value of positive 1 is applied. If it is about equal or neutral to the average of the property nominated then zero is applied. If it is less than the average to the property nominated, then the computer program assigns a value of negative one (−1).

Regarding all suburbs and the number of properties sold in all suburbs of a geographical location at step 312, again as with the number of properties sold the similar values are applied, positive one, zero and negative one for the three cases of comparison.

Finally at step 314 there is disclosed the percentage of sold properties to those listed. So if the agent's or agencies' average percentage is greater than the percentage of the property nominated, then the value applies positive two (+2), if it is approximately equal to the average percentage then the value applied is positive one (+1). Where the agent's percentage of sold to listed figure is less than the average for that property nominated then a value of negative two (−2) is applied.

Figure 29A:
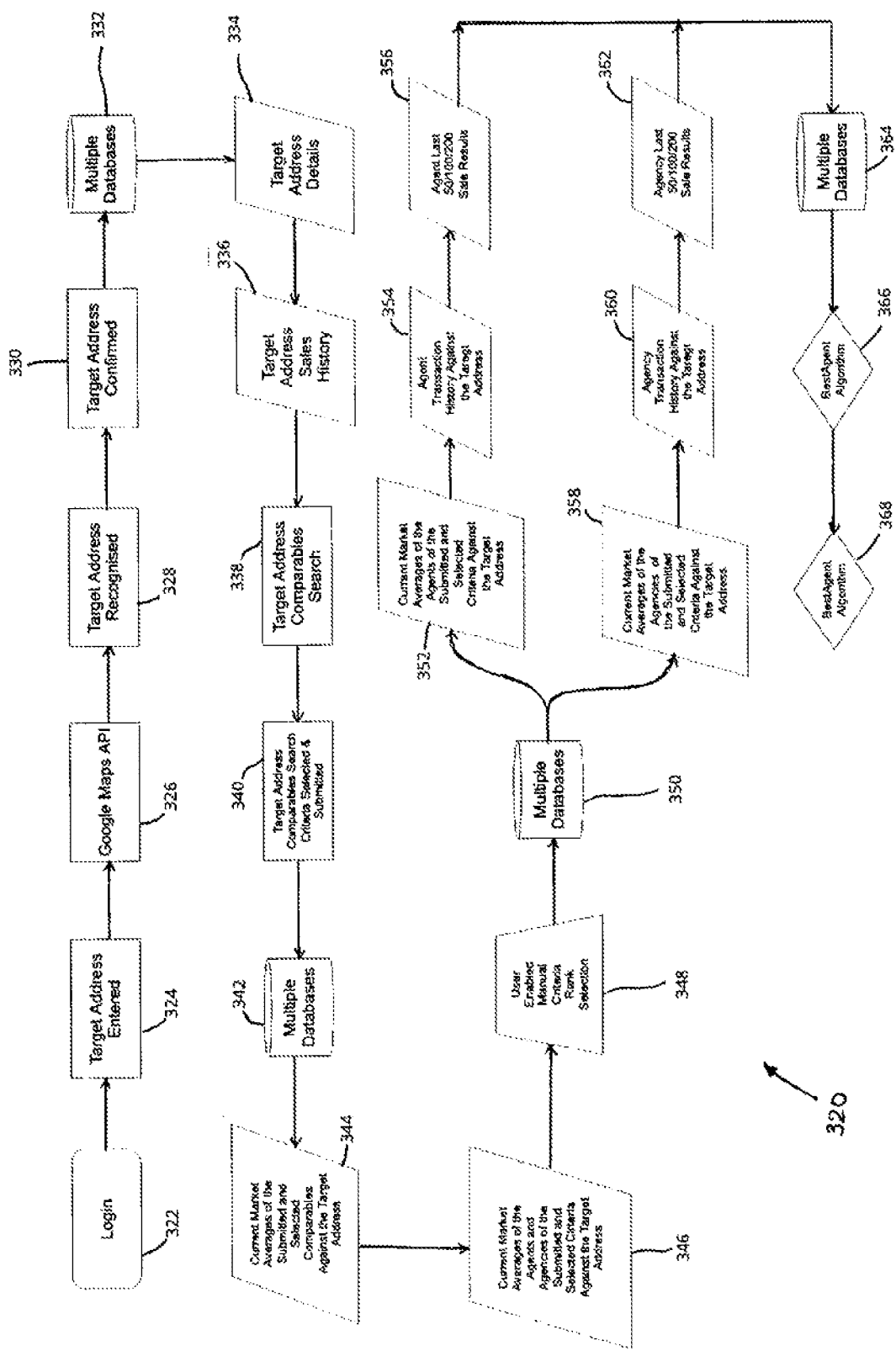
FIG. 29A shows a flow diagram of the process by which the optimal agent is determined from an initial targeted address.

Referring to FIG. 29A there is shown a flow diagram 320, arranged in 'swim lanes', of the process by which the best agent is determined from an initial target address. The flow diagram 320 first starts at process 322 where a registered user logs into a website that has a computer program at a resident server 18 which can undertake the task of determining the best or optimal agent. Once the user has logged in at process 322 a targeted address is entered at process 324 and a Google Maps API is displayed at process 326 to the user. At process 328 the target address is recognised and then at process 330 that address is confirmed from the addresses displayed on Google Maps to the user. Once the target address is confirmed at process 330, the computer program resident at server 18 searches multiple databases in process 332. The computer program accesses through APIs a number of databases such as 20, 22 and 24 to retrieve information relating to real estate on those databases. In particular, the data available includes all of the parameters mentioned previously in terms of the types of houses and the sales that have occurred and by whom, in other words which agent and which agency, together with the parameters such as square meterage of the property and the number of properties sold by each agent or agencies.

At process 334 the target address details are provided to the user and then at process 336 the target address sales history is provided to the user by the computer program which is located at server 18. Then at process 338 the target address comparable search is undertaken by the computer program and at process 340 the target address search criteria is selected and submitted by the user. At process 342 the computer program accesses the previously mentioned databases to find information on the property type and then at process 344 the current market averages of the submitted and selected comparable are formed against the target address. The process then moves to process 346 where the current market averages of the agents and agencies of the submitted and selected criteria are calculated against the target address. Thus the computer program calculates all of the averages for each agent and agency depending on the particular parameters and this is compared against the current market averages for those parameters over the entire sale history of the properties.

At process 348 the user is able to perform a manual rank search based on a number of selection criteria so that the user can find out which agent or agency is the top ranked in a particular criterion, such as number of sales or the differential in price between the list price and the sale price. At process 350 multiple databases again are accessed by the computer program to provide at process 352 the current market averages of the agents of the submitted and selected criteria which is against the target address and also at process 358 provides the current market averages of the agencies of the submitted and selected criteria against the target address. At process 354 the agent transaction history against the target address is provided. At process 356 the agent's last. 50, 100 and to 200 results (as an example) are displayed to the user. After process 358, at process 360 the agency transaction history against the targeted address is displayed to the user and then at process 362 the agency sales results from the last 50, 100 or 200 properties sold (as an example) are also displayed to the user. At process 364 multiple databases such as 20, 22 and 24 and accessed by the computer program to calculate the best agent at process 366 which has been previously described. Thus the computer program undertakes the algorithm described in relation to FIGS. 28A and 28B. Then finally at process 368 the Best Time algorithm is determined by the computer program to provide details to the user about when is the best time to sell throughout the year.

Figure 29B:
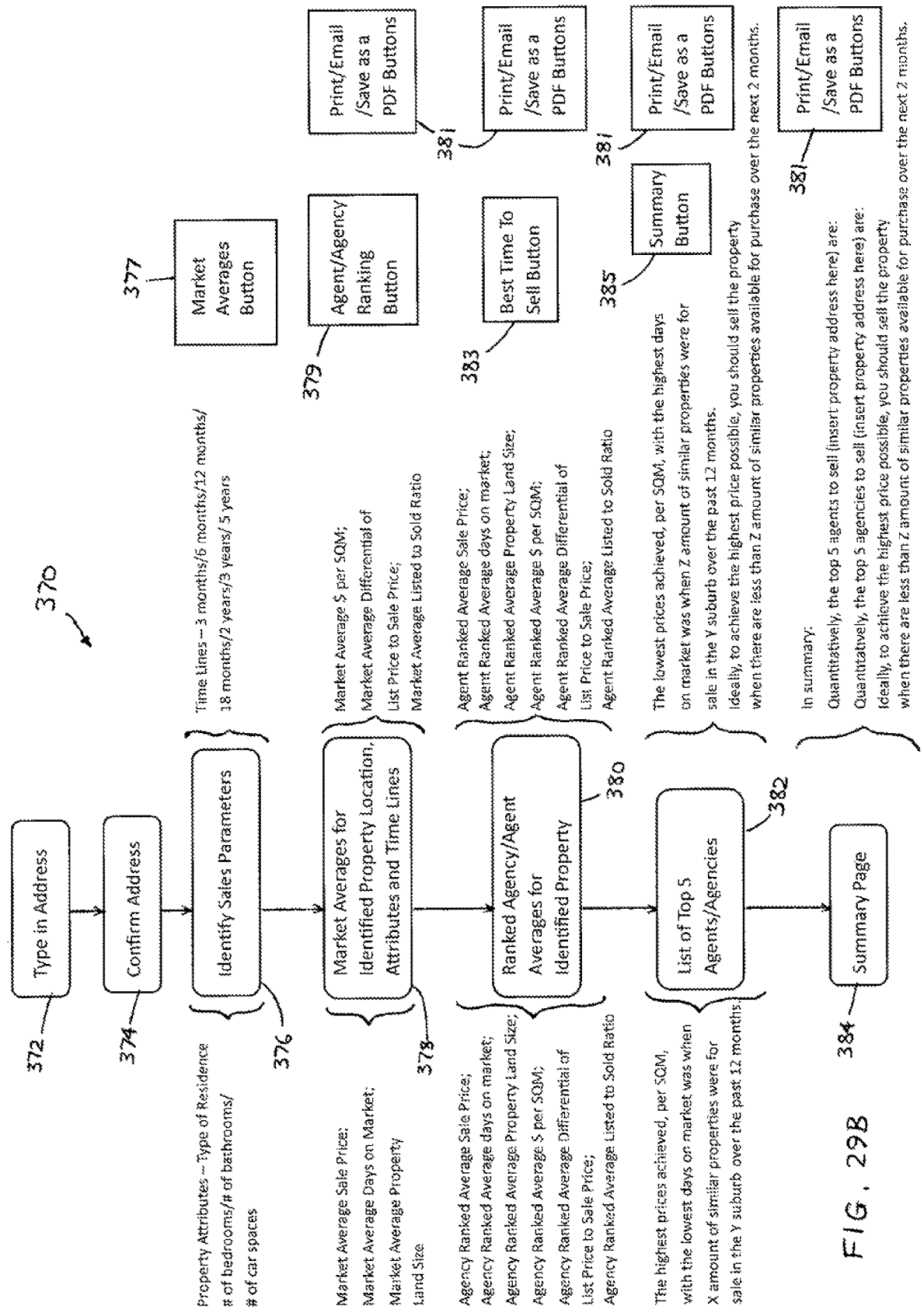
FIG. 29B shows a slightly different flow diagram to FIG. 29A of the process by which the optimal agent is determined from an initial targeted address.

In FIG. 29B there is shown another flow diagram 370 which is slightly different to the flow diagram 320 shown in FIG. 29a. Firstly at step 372 the user types in a target address of interest to the user. At step 374, the address is confirmed. At step 376 the particular sales parameters are identified, such as the property attributes being the type of residence, the number of bedrooms and bathrooms and the number of car spaces as an example. Also input to the selection by the user is the time lines of however far back the user wants to search the records of agents and agencies. At 377 there is a Market Averages button which can be clicked by the user in order to find such market averages which have been previously determined by the computer program at server 18.

Then at step 378 the market averages are identified for the property location, the attributes and the time lines. Thus the market averages for sale price, days on market, property land size, dollars or cost per square metre, the differential between the list price and sale price and also the listed to sold ratio or the sold to listed ratio. These are all determined by the computer program. At button 379 the user can click/access the agent or agency ranking button and toggle between the agent and agency. There is also a facility at 381 to print, email, save as PDF any of the information displayed to the user.

At step 380 the ranked agency and agent averages for the identified property are determined by the computer program. This includes the ranked average sale price for both agent and agency, the ranked average days on the market for both the agent and agency, the ranked average property land size for the agent and agency, the ranked average price per square metre for both agent and agency, the differential between the list price and sale price average for both agent and agency is also ranked and finally the ranked average sold to listed ratio (or listed to sold ratio) of the agent and agency is provided for. A Best Time To Sell button 383 can be clicked to determine, through the computer program, the best time to sell the property. Button 381 can also be clicked for the functions described in the previous paragraph.

At step 382 a list of the top five agents or agencies is determined by the computer program. The highest prices achieved, per square metre, with the lowest number of days on the market, was when X amount of similar properties were for sale in the Y suburb over the past 12 months (or any other time period). This is an algorithm that the computer program processes to determine the best time to sell. It also determines the lowest prices achieved, per square metre, with the highest days number of on the market and this was when Z amount of similar properties were for sale in the Y suburb over the past twelve months (or any other time period). Ideally to achieve the highest price possible, one should sell a property when there are less than Z amount of similar properties available for purchase over the next two months. A Summary button 385 is also available to the user to print or email or save as PDF. Button 381 can also be clicked for the functions described in the previous paragraph.

At step 384 there is a Summary page which is provided to the user accessed through button 385. The program provides the top five agents to sell for a particular address and the top five agencies to sell for an address provided by the user. Button 381 can also be clicked for the functions described in the previous paragraph.

Figure 30:
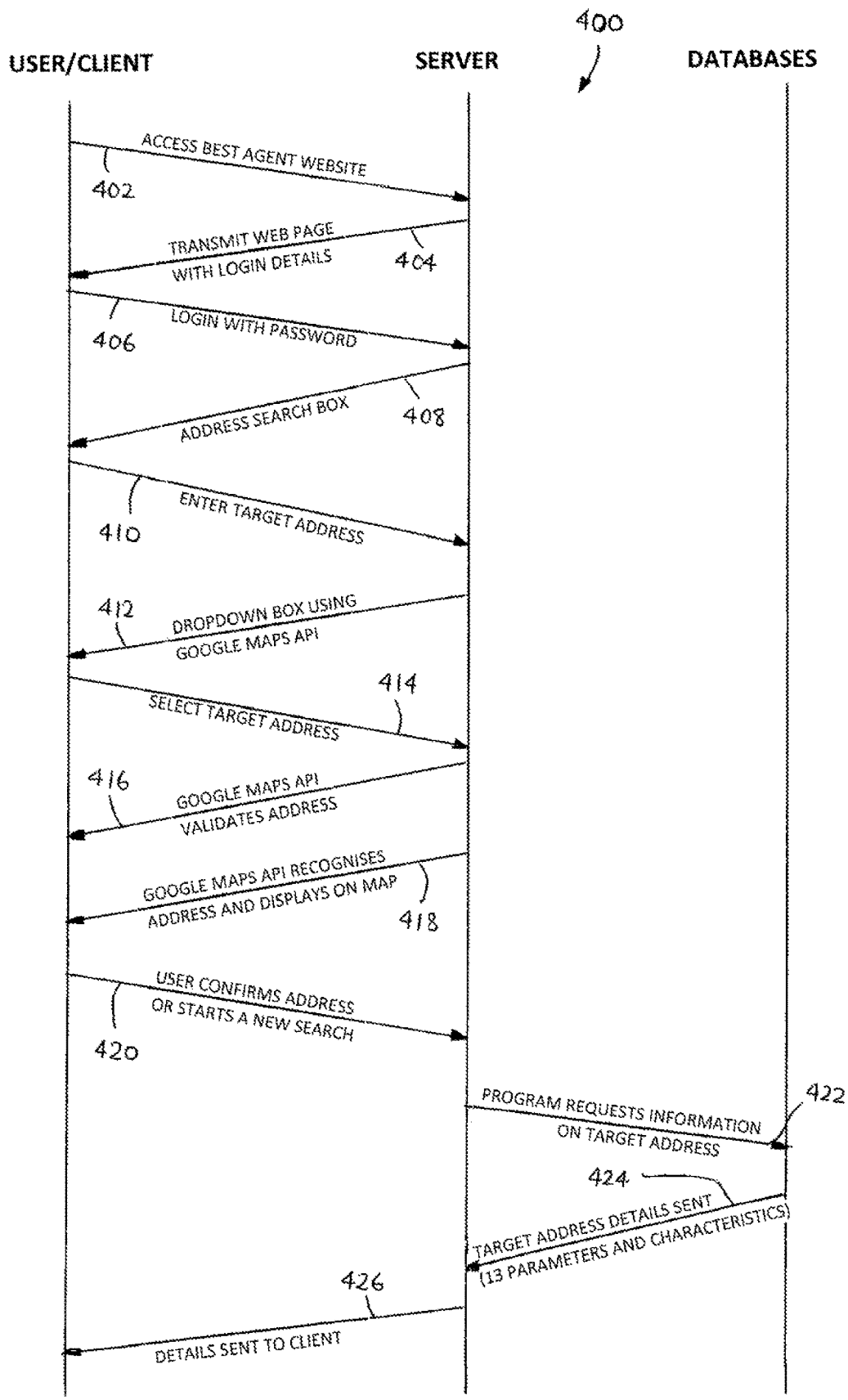
FIGS. 30 and 31 are signalling diagrams that depict the signal exchange between the user/client processor, a server and associated computer program and proprietary databases.

Referring to FIG. 30, there is shown a signalling diagram 400 that depicts the sequential signal exchange between the user/client processor (mobile phone or laptop), the server 18 and associated computer program, and proprietary databases 20, 22 and 24. At process 402, the user makes a request to access the Best Agent website, for which server 18 provides the respective web pages. At process 404 a web page with the login details is provided to the user. At process 406 the user, registered to the website, enters an email address and password and this sent to server 18. The server 18, upon verifying the user, subsequently provides a web page 34 with an address search box 36 at process 408, and the user enters the target address for which the user is interested in and finding a best agent or agency in a defined radius from that property, at process 410. At process 412, the server 18 provides a drop-down box 42 (FIG. 4) using the Google Maps API. The user then selects the target address, after prompts from Google Maps API, and sends the entered information back to server 18 at process 414.

At process 416, the Google Maps API validates the target address. At process 418, once the address is recognized by the Google Maps API, the property appears highlighted on a map on the user's screen with options to view the area around the target address and see other properties in the vicinity. At process 420 the user confirms the address, through button 52, or starts a new search, and a signal is sent to server 18. The computer program, through data supplied APIs of each of databases 20, 22 and 24, requests information from these databases on the property entered and requested by the user at process 422. Each of the databases 20, 22 and 24 are not available to the general public and are pay databases, in that to gain access to the databases a subscription or membership has to be paid. All the databases contain a large amount of data and multiple data sets on all properties sold in a particular jurisdiction, for example throughout all of Australia.

Figure 31:
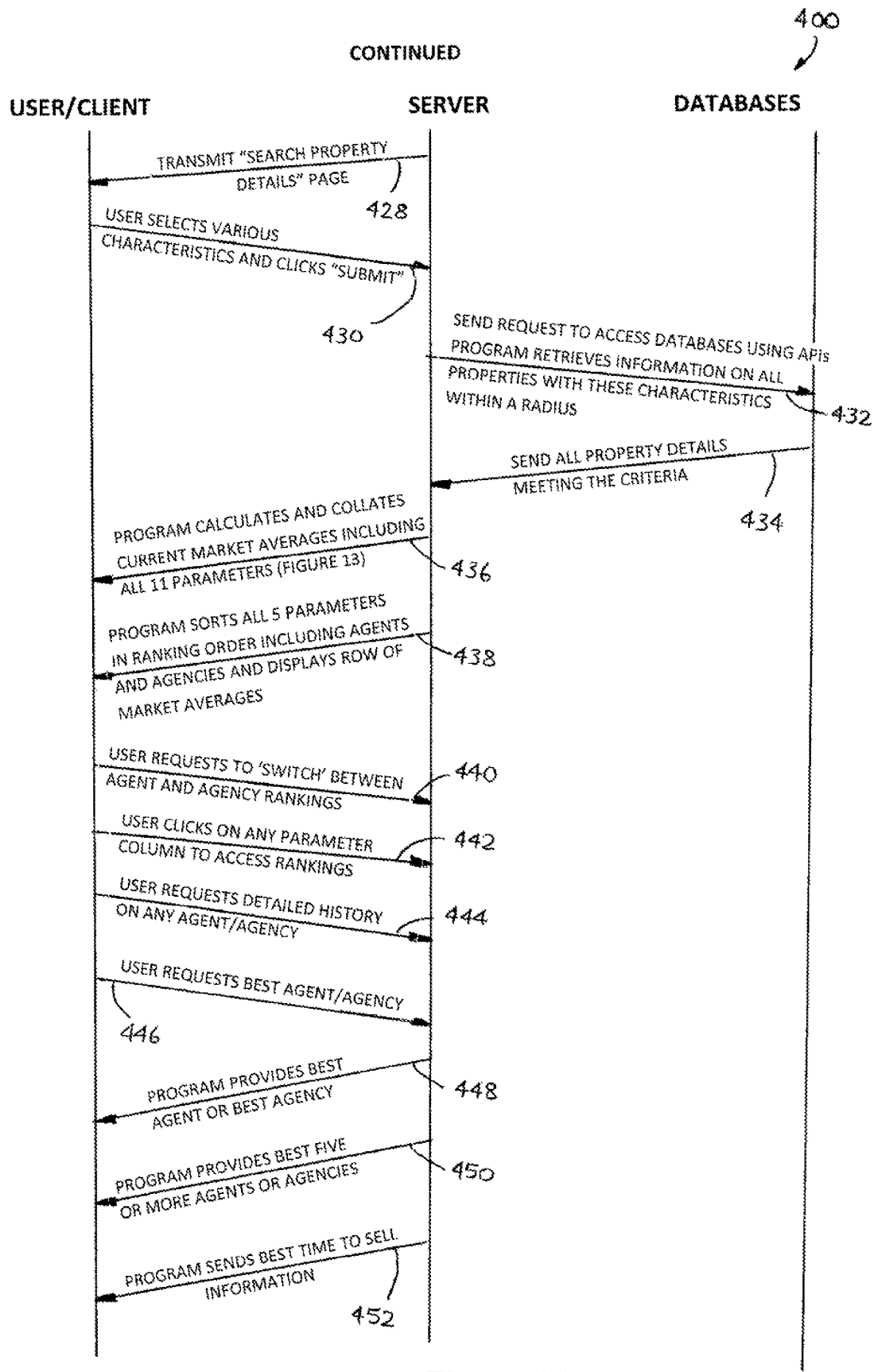

At process 424, thirteen parameters (or possibly more) are sent from the databases to the server 18 under the instructions of the computer program. These parameters are then sent to the user at process 426, as seen on screen 58 in FIG. 9 as Address Details. The Search Property Details page 92 is then sent by the computer program at server 18 to the user at process 428, as illustrated in FIG. 31, or in the same signal transmission process 426. The Search Property Details is usually displayed beneath the Address Details box 58. The information contained in the Search Property Details is set as a default to be the same characteristics initially requested by the user for the target property, for example, a three bedroom house, with one bathroom, one car space. However this can be changed, through drop down box 90 and the various slides as described with reference to FIGS. 10 and 11. These are all provided by the computer program operating at server 18.

As illustrated in FIG. 31, at process 430 the user can change his or her selection for the parameters desired. The user submits to server 18, through button 114, a ranking search for the best agent or best agency in relation to 3 bedroom houses, with one bathroom and one car space within a 1 km radius of the target property sold within the last 12 months. The computer program then sends a request at process 432 to access the proprietary databases 20, 22 and 24 using the database APIs to retrieve all information stored about the type of property and its characteristics including locations 94, 98, 102, 106, 110 and the names of the agent, agency, the sale price, the difference in the list price and the sale price, the land size, the price per square metre, the number of days the property was on the market and the number of properties sold by the agent and agency. The computer program searches within the geospatial defined parameters selected from the target property address point of origin. All of this information is then transmitted back to server 18 at process 434.

At process 436 the computer program calculates and collates the current market averages including for all eleven parameters and characteristics (see FIG. 13) and sends this to the user. At process 438, the computer program sorts all of the five parameters (average list price to sale price differential, average sale price, average price per square metre, average days on the market and number of properties sold) in ranking order for each agent and each agency.

It displays these to the user and the user can click on a button 126 to 136 to find the various rankings at any stage. A row of the market averages is displayed by the program for comparison purposes. At process 440 a user can switch between viewing the rankings for a best agent and the rankings for a best agency over the five parameters, using selection buttons 121 and 123. At process 442 the user can click on any parameter ranking, at the top of each column in row 127. These options are all provided by the program.

At process 444 a request signal can be sent from the user to the server 18 to enable the program to send a detailed history of a particular agent or agency by highlighting and clicking on a row, such as 242 in FIG. 26, for the agent or an agency when the button 121 is set to search on agency rankings. At process 446 the user makes a request to determine the best agent or agency. At process 448, the computer program calculates a best agent for a user to use, to sell his or her property, based on a weighted aggregate of the combined parameters for each agent/agency and after all the values are determined by the program according to the algorithm shown in FIGS. 28A and 28B. At process 450 the computer program sends the best agent or agency to the user or a list of the top five agents and agencies to use. Following the choice of best agent/agency, this button is replaced by the "Best Time to Sell" button, and when it is clicked by the user, it enables the computer program to determine this and send such information to the user at process 452.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

A method, using a computer system having a processor and a memory, of providing an optimal real estate agent or agency for a user to use to sell a property, comprises (a) electronically accessing real estate parameters from a plurality of proprietary databases; (b) electronically assigning a value to each agent or agency for each parameter compared to a market average for each parameter; (c) electronically ranking each agent or agency based on a cumulative value of the parameters; and (d) electronically sending to the user an optimal real estate agent or agency based on the cumulative value.

The optimal agent or agency provided to the user may have the highest cumulative value.

The cumulative value may be calculated based on a weighted aggregate of the combined parameters for each agent or agency.

The method may comprise electronically enabling the user to undertake a property search having variable characteristics such as number of bedrooms, number of bathrooms, and car spaces.

The method may comprise electronically accessing the proprietary databases to obtain information on characteristics of a target address together with further parameters on the target address and sending this information to the user.

The method may comprise electronically enabling a user to find information on properties within a variable radius of the target address including the agent or agency selling such properties and within a variable time period.

The method may comprise electronically enabling the user to undertake a property search having variable characteristics such as number of bedrooms, number of bathrooms and car spaces; and after selection by the user of a criterion for each of the variable characteristics, electronically accessing the proprietary databases to retrieve the requested information on the chosen characteristics, searching within a predefined radius from the target address and transmitting the requested information to a server.

The method may comprise electronically calculating and collating current market averages for the parameters and sending the averages to the user.

The method may comprise electronically sorting a number of parameter averages associated with each agent or agency into a ranking order.

The user may be able to access individual rankings for each parameter average and compare each parameter average to market averages and also access individual rankings on the number of properties sold by an agent or agency.

The ranked parameter averages may include any one of list price to sale price differential, land size, value per square metre, average days on the market, and sale price.

The user may switch between agent ranking and agency rankings on each of the parameters.

The user may select an agent or agency to view past history of that agent or agency.

The method may comprise electronically calculating an optimal agent or agency using a weighted average of combined cumulative values per parameter average.

A computer-implemented method, using a processor and a memory, to provide an optimal real estate agent or agency for a user to use to sell a property, comprises (a) electronically accessing real estate parameters from a plurality of proprietary databases; (b) electronically assigning a value to each agent or agency for each parameter compared to a market average for each parameter; (c) electronically ranking each agent or agency based on a cumulative value of the parameters; and (d) electronically sending to the user an optimal real estate agent or agency based on the cumulative value.

A computer program product, non-transitorily existent on a computer-usable medium, that, when executed by a computer, enable the computer to perform a method, comprises code instructions, when the computer program product is executed on a computer, to execute a method for providing an optimal real estate agent or agency for a user to use to sell a property; the code instructions, when providing an optimal real estate agent or agency for a user to use to sell a property, accessing real estate parameters from a plurality of proprietary databases; the code instructions, when providing an optimal real estate agent or agency for a user to use to sell a property, assigning a value to each agent or agency for each parameter compared to a market average for each parameter; the code instructions, when providing an optimal real estate agent or agency for a user to use to sell a property, ranking each agent or agency based on a cumulative value of the parameters; and the code instructions, when providing an optimal real estate agent or agency for a user to use to sell a property, sending to the user an optimal real estate agent or agency based on the cumulative value.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method, using a computer system having an electronic processor and a non-transitory electronic memory, of providing an optimal real estate agent or agency for a user to use to sell a property based upon user defined property characteristics, comprising:

(a) inputting, through a user interface, a user defined target address;

(b) electronically, using the electronic processor and the non-transitory electronic memory, accessing, based upon the inputted user defined target address, a plurality of proprietary databases to obtain property characteristics corresponding to the user defined target address, property characteristics including number of bedrooms, number of bathrooms, and car spaces;

(c) communicating, using the electronic processor and the non-transitory electronic memory, the accessed property characteristics to the user;

(d) electronically enabling, through the user interface, the user to modify or accept the communicated property characteristics to create a user defined set of property characteristic search parameters;

(e) electronically, using the electronic processor and the non-transitory electronic memory, retrieving, based on the user defined set of property characteristic search parameters within a predefined radius from the user defined target address and within a predefined time period, a plurality of user defined real estate agent/agency based parameters from the plurality of proprietary databases, each real estate agent or real estate agency having a plurality of distinct real estate agent/agency based parameters associated therewith;

(f) electronically, using the electronic processor and the non-transitory electronic memory, calculating a current market average for each retrieved user defined real estate agent/agency based parameter;

(g) electronically, using the electronic processor and the non-transitory electronic memory, communicating, to the user, the current market average for each retrieved user defined real estate agent/agency based parameter;

(h) electronically, using the electronic processor and the non-transitory electronic memory, assigning a value to each real estate agent or real estate agency for each retrieved user defined real estate agent/agency based parameter associated therewith, each value corresponding to a comparison of a market average of a real estate agent/agency based parameter and a corresponding retrieved user defined real estate agent/agency based parameter;

(i) electronically, using the electronic processor and the non-transitory electronic memory, sorting a number of real estate agent/agency based parameters associated with each real estate agent or real estate agency into a ranking order;

(j) electronically, using the electronic processor and the non-transitory electronic memory, ranking each agent or agency based on a cumulation of the values for each real estate agent or real estate agency;

(k) electronically, using the electronic processor and the non-transitory electronic memory, providing the user access to individual rankings for each real estate agent/agency based parameter;

(l) electronically, using the electronic processor and the non-transitory electronic memory, providing the user access to the comparison of the market average of a real estate agent/agency based parameter and the corresponding retrieved user defined real estate agent/agency based parameter;

(m) electronically, using the electronic processor and the non-transitory electronic memory, providing the user access to individual rankings on the number of properties sold by a real estate agent or real estate agency; and (n) electronically, using the electronic processor and the non-transitory electronic memory, sending to the user an optimal real estate agent or real estate agency based on the ranking of each real estate agent or real estate agency.

2. The method according to claim 1, wherein the optimal real estate agent or real estate agency provided to the user has the highest cumulated value.

3. The method according to claim 2, wherein the cumulated value is calculated based on a weighted aggregate of the combined retrieved user defined real estate agent/agency based parameters for each real estate agent or real estate agency.

4. The method according to claim 1, wherein the individual rankings for each real estate agent/agency based parameter include any one of list price to sale price differential, land size, value per square meter, average days on the market, and sale price.

5. The method according to claim 4, wherein the user can switch between real estate agent ranking and real estate agency rankings for each real estate agent/agency based parameter.

6. The method according to claim 5, wherein the user can select real estate agent or real estate agency to view past history of that real estate agent or real estate agency.

7. The method according to claim 6, wherein the optimal real estate agent or real estate agency provided to the user is electronically calculated using a weighted average of combined cumulated values per real estate agent/agency based parameter average.

8. A computer-implemented method, an electronic processor and a non-transitory electronic memory, to provide an optimal real estate agent or agency for a user to use to sell a property based upon user defined property characteristics, comprising:

(a) inputting, through a user interface, a user defined target address;

(b) electronically, using the electronic processor and the non-transitory electronic memory, accessing, based upon the inputted user defined target address, a plurality of proprietary databases to obtain property characteristics corresponding to the user defined target address, property characteristics including number of bedrooms, number of bathrooms, and car spaces;

(c) electronically, using the electronic processor and the non-transitory electronic memory, communicating the accessed property characteristics to the user;

(d) electronically, using the electronic processor and the non-transitory electronic memory, enabling, through the user interface, the user to modify or accept the communicated property characteristics to create a set of property characteristic search parameters;

(e) electronically, using the electronic processor and the non-transitory electronic memory, retrieving, based on the set of property characteristic search parameters within a predefined radius from the user defined target address and within a predefined time period, a plurality of real estate agent/agency based parameters from the plurality of proprietary databases, each real estate agent or real estate agency having a plurality of distinct retrieved real estate agent/agency based parameters associated therewith;

(f) electronically, using the electronic processor and the non-transitory electronic memory, calculating a current market average for each real estate agent/agency based parameter;

(g) electronically, using the electronic processor and the non-transitory electronic memory, communicating, to the user, the current market average for each real estate agent/agency based parameter;

(h) electronically, using the electronic processor and the non-transitory electronic memory, assigning a value to each real estate agent or real estate agency for each retrieved real estate agent/agency based parameter associated therewith, each value corresponding to a comparison of a market average of a real estate agent/agency based parameter and a corresponding retrieved real estate agent/agency based parameter;

(i) electronically, using the electronic processor and the non-transitory electronic memory, sorting a number of real estate agent/agency based parameters associated with each real estate agent or real estate agency into a ranking order;

(j) electronically, using the electronic processor and the non-transitory electronic memory, ranking each agent or agency based on a cumulation of the values for each real estate agent or real estate agency;

(k) electronically, using the electronic processor and the non-transitory electronic memory, providing the user access to individual rankings for each real estate agent/agency based parameter;

(l) electronically, using the electronic processor and the non-transitory electronic memory, providing the user access to the comparison of the market average of a real estate agent/agency based parameter and the corresponding retrieved real estate agent/agency based parameter;

(m) electronically, using the electronic processor and the non-transitory electronic memory, providing the user access to individual rankings on the number of properties sold by a real estate agent or real estate agency; and (n) electronically, using the electronic processor and the non-transitory electronic memory, sending to the user an optimal real estate agent or real estate agency based on the ranking.

9. A non-transitory computer-readable medium with stored code instructions thereon, that, when executed by a computer, enable the computer to perform a method, comprising:

code instructions, when the computer program product is executed on a computer, to execute a method for providing an optimal real estate agent or agency for a user to use to sell a property based upon user defined property characteristics;

said code instructions, when the computer program product is executed on a computer, electronically enabling inputting of, through a user interface, a user defined target address;

said code instructions, when the computer program product is executed on a computer, electronically enabling assessment of, based upon the inputted user defined target address, a plurality of proprietary databases to obtain property characteristics corresponding to the user defined target address, property characteristics including number of bedrooms, number of bathrooms, and car spaces;

said code instructions, when the computer program product is executed on a computer, electronically enabling communication of the accessed property characteristics to the user;

said code instructions, when the computer program product is executed on a computer, electronically enabling modification or acceptance by the user, through the user interface, the communicated property characteristics to create a set of property characteristic search parameters;

said code instructions, when the computer program product is executed on a computer, electronically enabling retrieval of, based on the set of property characteristic search parameters within a predefined radius from the user defined target address and within a predefined time period, a plurality of real estate agent/agency based parameters from the plurality of proprietary databases, each real estate agent or real estate agency having a plurality of distinct retrieved real estate agent/agency based parameters associated therewith;

said code instructions, when the computer program product is executed on a computer, electronically enabling calculation of a current market average for each real estate agent/agency based parameter;

said code instructions, when the computer program product is executed on a computer, electronically enabling communication of, to the user, the current market average for each real estate agent/agency based parameter;

said code instructions, when the computer program product is executed on a computer, electronically enabling assignment of a value to each real estate agent or real estate agency for each retrieved real estate agent/agency based parameter associated therewith, each value corresponding to a comparison of a market average of a real estate agent/agency based parameter and a corresponding retrieved real estate agent/agency based parameter;

said code instructions, when the computer program product is executed on a computer, electronically enabling sorting of a number of real estate agent/agency based parameters associated with each real estate agent or real estate agency into a ranking order;

said code instructions, when the computer program product is executed on a computer, electronically enabling ranking of each agent or agency based on a cumulation of the values for each real estate agent or real estate agency;

said code instructions, when the computer program product is executed on a computer, electronically enabling the user access to individual rankings for each real estate agent/agency based parameter;

said code instructions, when the computer program product is executed on a computer, electronically enabling the user access to the comparison of the market average of a real estate agent/agency based parameter and the corresponding retrieved real estate agent/agency based parameter;

said code instructions, when the computer program product is executed on a computer, electronically enabling the user access to individual rankings on the number of properties sold by a real estate agent or real estate agency; and said code instructions, when the computer program product is executed on a computer, electronically sending to the user an optimal real estate agent or real estate agency based on the ranking.

* * * * *